United States Patent
Ihara et al.

(12) 
(10) Patent No.: US 6,698,948 B2
(45) Date of Patent: Mar. 2, 2004

(54) PRINTING DATA AND PICTURE DATA TRANSFERRING METHOD

(75) Inventors: Yushi Ihara, Kanagawa (JP); Takashi Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 09/890,523

(22) PCT Filed: Dec. 4, 2000

(86) PCT No.: PCT/JP00/08583

§ 371 (c)(1), (2), (4) Date: Jan. 22, 2002

(87) PCT Pub. No.: WO01/41431

PCT Pub. Date: Jun. 7, 2001

(65) Prior Publication Data

US 2002/0159806 A1 Oct. 31, 2002

(30) Foreign Application Priority Data

Dec. 3, 1999 (JP) ............................................. 11-345471
Dec. 9, 1999 (JP) ............................................. 11-350866

(51) Int. Cl.$^7$ .................................................. B41J 11/44
(52) U.S. Cl. ........................... 400/61; 400/70; 400/76; 358/1.15
(58) Field of Search ............................. 400/61, 70, 76; 358/1.15; 370/466

(56) References Cited

U.S. PATENT DOCUMENTS 6,130,758 A  * 10/2000  Funazaki ................... 358/1.15

6,529,522 B1  *  3/2003  Ito et al. ..................... 370/466

FOREIGN PATENT DOCUMENTS

| EP | 0 859 324 | 8/1998 | |
| EP | 0 884 880 | 12/1998 | |
| EP | 0 938 218 | 8/1999 | |
| JP | 04220366 A  * | 8/1992 | .............. B41J/5/30 |
| JP | 8-279818 | 10/1996 | |
| JP | 10-322373 | 12/1998 | |
| JP | 10-341247 | 12/1998 | |
| JP | 11167630 A1  * | 6/1999 | .............. G06T/1/60 |
| JP | 11-252153 | 9/1999 | |
| WO | WO 99/06916  * | 2/1999 | ........... G06F/13/16 |

* cited by examiner

*Primary Examiner*—Charles H. Nolan, Jr.
(74) *Attorney, Agent, or Firm*—Frommer Lawrence & Haug LLP; William S. Frommer; Hans R. Mahr

(57) ABSTRACT

If bus resetting occurs during transmission of printing data (ST21), a printer device is requested to transmit the information output before the occurrence of bus resetting by a STB (C18). Responsive to a request from the STB, the information input before the occurrence of the bus resetting is output from the printing device to the STB (R18). Based on the information input responsive to the request, printing data is again output from the STB to the printing device (C19). So, the system itself recognizes the information output by the STB before the occurrence of the bus resetting to re-initiate data transmission as from mid data (S14). Thus, data transmission is to be carried out in a shorter time even when the bus resetting occurs to shorten the entire printing time.

19 Claims, 31 Drawing Sheets

| | pixel_x | pixel_y | interlaced/progressive | pixel format | screen aspect ratio | pixel aspect ratio | based standard | image size |
|---|---|---|---|---|---|---|---|---|
| 1080_422_16×9 | 1920 | 1080 | interlaced/progressive | YCbCr 4:2:2 | 16:9 | 1:1 | ITU-R BT. 709-2 | 3.96MB |
| 1080_420_16×9 | 1920 | 1080 | interlaced/progressive | YCbCr 4:2:0 | 16:9 | 1:1 | ITU-R BT. 709-2 | 2.97MB |
| 720_422_16×9 | 1280 | 720 | progressive | YCbCr 4:2:2 | 16:9 | 1:1 | ANSI/SMPTE 296M-1997 | 1.76MB |
| 720_420_16×9 | 1280 | 720 | progressive | YCbCr 4:2:0 | 16:9 | 1:1 | ANSI/SMPTE 296M-1997 | 1.32MB |
| 576_422_4×3 | 720 | 576 | interlaced/progressive | YCbCr 4:2:2 | 4:3 | 1.07:1 | ITU-R BT.1203 | 810KB |
| 576_420_4×3 | 720 | 576 | interlaced/progressive | YCbCr 4:2:0 | 4:3 | 1.07:1 | ITU-R BT.1203 | 608KB |
| 480_422_16×9 | 720 | 480 | interlaced/progressive | YCbCr 4:2:2 | 16:9 | 1.19:1 | ITU-R BT. 709-2 | 675KB |
| 480_420_16×9 | 720 | 480 | interlaced/progressive | YCbCr 4:2:0 | 16:9 | 1.19:1 | ITU-R BT. 709-2 | 506KB |
| 480_422_4×3 | 720 | 480 | interlaced/progressive | YCbCr 4:2:2 | 4:3 | 0.89:1 | ITU-R BT.601-4 | 575KB |
| 480_420_4×3 | 720 | 480 | interlaced/progressive | YCbCr 4:2:0 | 4:3 | 0.89:1 | ITU-R BT.601-4 | 506KB |

FIG.7

| | msb | | | | | | lsb |
|---|---|---|---|---|---|---|---|
| opcode | \multicolumn{7}{c}{CAPTURE($42_{16}$)} |
| operand [0] | \multicolumn{7}{c}{subfunction} |
| operand [1] | \multicolumn{5}{c}{source_subunit_type} | \multicolumn{2}{c}{source_subunit_ID} |
| operand [2] | \multicolumn{7}{c}{source_plug} |
| operand [3] | \multicolumn{7}{c}{status} |
| operand [4] | \multicolumn{7}{c}{dest_plug} |
| operand [5] | | | | | | | |
| ⋮ | \multicolumn{7}{c}{print_job_ID} |
| operand [16] | | | | | | | |
| operand [17] | | | | | | | |
| operand [18] | \multicolumn{7}{c}{data_size} |
| operand [19] | | | | | | | |
| operand [20] | | | | | | | |
| operand [21] | \multicolumn{7}{c}{image_size_x} |
| operand [22] | | | | | | | |
| operand [23] | \multicolumn{7}{c}{image_size_y} |
| operand [24] | | | | | | | |
| operand [25] | \multicolumn{7}{c}{image_format_specifier} |
| operand [26] | | | | | | | |
| operand [27] | | | | | | | |
| operand [28] | \multicolumn{7}{c}{reserved} |
| operand [29] | | | | | | | |
| operand [30] | \multicolumn{7}{c}{next_pic} |
| operand [31] | \multicolumn{7}{c}{next_page} |
| operand [32] | | | | | | | |

FIG. 8

| Value | Symbol | Meaning |
|---|---|---|
| $01_{16}$ | receive | Receive the image |
| $02_{16}$ | restore | Restore the image sending |
| $03_{16}$ | abort | Abort the image sending |
| $04_{16}$ | get_status | Get the capture status |
| other values | – | reserved |

FIG.9

| value | Type | Meaning |
|---|---|---|
| $20_{16}$ | 1080i _ 422chunky _ 16×9 | |
| $21_{16}$ | 1080p _ 422chunky _ 16×9 | |
| $22_{16}$ | 720p _ 422chunky _ 16×9 | |
| $23_{16}$ | 480l _ 422chunky _ 16×9 | |
| $24_{16}$ | 480p _ 422chunky _ 16×9 | |
| $25_{16}$ | 480l _ 422chunky _ 4×3 | |
| $26_{16}$ | 480p _ 422chunky _ 4×3 | |
| $28_{16}$ | 1080i _ 422liner _ 16×9 | |
| $29_{16}$ | 1080p _ 422liner _ 16×9 | |
| $2A_{16}$ | 720p _ 422liner _ 16×9 | |
| $2B_{16}$ | 480l _ 422liner _ 16×9 | |
| $2C_{16}$ | 480p _ 422liner _ 16×9 | |
| $2D_{16}$ | 480l _ 422liner _ 4×3 | |
| $2E_{16}$ | 480p _ 422liner _ 4×3 | |
| $30_{16}$ | 1080i _ 420planer _ 16×9 | |
| $31_{16}$ | 1080p _ 420planer _ 16×9 | |
| $32_{16}$ | 720p _ 420planer _ 16×9 | |
| $33_{16}$ | 480l _ 420planer _ 16×9 | |
| $34_{16}$ | 480p _ 420planer _ 16×9 | |
| $35_{16}$ | 480l _ 420planer _ 4×3 | |
| $36_{16}$ | 480p _ 420planer _ 4×3 | |
| $38_{16}$ | 1080i _ 420liner _ 16×9 | |
| $39_{16}$ | 1080p _ 420liner _ 16×9 | |
| $3A_{16}$ | 720p _ 420liner _ 16×9 | |
| $3B_{16}$ | 480l _ 420liner _ 16×9 | |
| $3C_{16}$ | 480p _ 420liner _ 16×9 | |
| $3D_{16}$ | 480l _ 420liner _ 4×3 | |
| $3E_{16}$ | 480p _ 420liner _ 4×3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.10

| Value(MSB) | Value(LSB) | Type | Meaning |
|---|---|---|---|
| $00_{16}$ | | | |
| | $00_{16}$ | sRGB raw | sRGB raw |
| | $01_{16}$ | sRGB raw, quadlet | |
| $01_{16}$ | | | |
| | $0X_{16}$ | YCC4:2:2 raw/pixel | YCC raw |
| | $1X_{16}$ | YCC4:2:2 raw/line | |
| | $8X_{16}$ | YCC4:2:0 raw/pixel | |
| | $9X_{16}$ | YCC4:2:0 raw/line | |
| | $X0_{16}$ | Pixel ratio 1.00×1.00 / ITU-R BT.709-2 / interlace | |
| | $X1_{16}$ | Pixel ratio 1.19×1.00 / ITU-R BT.709-2 / interlace | |
| | $X2_{16}$ | Pixel ratio 0.89×1.00 / ITU-R BT.709-2 / interlace | |
| | $X3_{16}$ | Pixel ratio 0.89×1.00 / ITU-R BT.601-4 / interlace | |
| | $X4_{16}$ | Pixel ratio 1.07×1.00 / ITU-R BT.1203 / interlace | |
| | $X8_{16}$ | Pixel ratio 1.00×1.00 / ITU-R BT.709-2 / progressive | |
| | $X9_{16}$ | Pixel ratio 1.19×1.00 / ITU-R BT.709-2 / progressive | |
| | $XA_{16}$ | Pixel ratio 0.89×1.00 / ITU-R BT.709-2 / progressive | |
| | $XB_{16}$ | Pixel ratio 0.89×1.00 / ITU-R BT.601-4 / progressive | |
| | $XC_{16}$ | Pixel ratio 1.07×1.00 / ITU-R BT.1203 / progressive | |
| $10_{16}$ | | | DCF Object |
| | $00_{16}$ | Exif 2.1 | |
| | $01_{16}$ | JFIF | |
| | $02_{16}$ | TIFF | |
| | $0F_{16}$ | JPEG | |
| $80_{16} \sim 8F_{16}$ | $00_{16} \sim FF_{16}$ | Vendor Dependent format | |
| $FE_{16}$ | | Unit Plug defined | Special meaning |
| | $00_{16}$ | don't care | |
| | $01_{16}$ | | |

FIG.11

| $Y_1(L_1)$ | $Y_2(L_1)$ | $Cb_1(L_1)$ | $Cr_1(L_1)$ |
|---|---|---|---|
| $Y_3(L_1)$ | $Y_4(L_1)$ | $Cb_3(L_1)$ | $Cr_3(L_1)$ |
| | | ⋮ | |
| $Y_{N-1}(L_1)$ | $Y_N(L_1)$ | $Cb_{N-1}(L_1)$ | $Cr_{N-1}(L_1)$ |
| $Y_1(L_2)$ | $Y_2(L_2)$ | $Cb_1(L_2)$ | $Cr_1(L_2)$ |
| | | ⋮ | |
| $Y_{N-1}(L_M)$ | $Y_N(L_M)$ | $Cb_{N-1}(L_M)$ | $Cr_{N-1}(L_M)$ |

FIG.12

| $Y_1(L_1)$ | $Y_2(L_1)$ | $Y_1(L_2)$ | $Y_2(L_2)$ |
|---|---|---|---|
| $Cb_1(L_1)$ | $Cr_1(L_1)$ | $Y_3(L_1)$ | $Y_4(L_1)$ |
| $Y_3(L_2)$ | $Y_4(L_2)$ | $Cb_3(L_1)$ | $Cr_3(L_1)$ |
| | | ⋮ | |
| $Y_{N-3}(L_{M-1})$ | $Y_{N-2}(L_{M-1})$ | $Y_{N-3}(L_M)$ | $Y_{N-2}(L_M)$ |
| $Cb_{N-3}(L_{M-1})$ | $Cr_{N-3}(L_{M-1})$ | $Y_{N-1}(L_{M-1})$ | $Y_N(L_{M-1})$ |
| $Y_{N-1}(L_M)$ | $Y_N(L_M)$ | $Cb_{N-1}(L_{M-1})$ | $Cr_{N-1}(L_{M-1})$ |

FIG.13

| $Y_1(L_1)$ | $Y_2(L_1)$ | $Y_3(L_1)$ | $Y_4(L_1)$ |
|---|---|---|---|
| ⋮ | ⋮ | ⋮ | ⋮ |
| $Y_{N-3}(L_1)$ | $Y_{N-2}(L_1)$ | $Y_{N-1}(L_1)$ | $Y_N(L_1)$ |
| $Cb_1(L_1)$ | $Cr_1(L_1)$ | $Cb_3(L_2)$ | $Cr_3(L_1)$ |
| ⋮ | ⋮ | ⋮ | ⋮ |
| $Cb_{N-3}(L_M)$ | $Cr_{N-3}(L_1)$ | $Cb_{N-1}(L_1)$ | $Cr_{N-1}(L_1)$ |
| $Y_1(L_2)$ | $Y_2(L_2)$ | $Y_3(L_1)$ | $Y_4(L_1)$ |
| ⋮ | ⋮ | ⋮ | ⋮ |
| $Cb_{N-3}(L_M)$ | $Cr_{N-3}(L_M)$ | $Cb_{N-1}(L_M)$ | $Cr_{N-1}(L_M)$ |

FIG.14

| $Y_1(L_1)$ | $Y_2(L_1)$ | $Y_3(L_1)$ | $Y_4(L_1)$ |
|---|---|---|---|
| | ⋮ | | |
| $Y_{N-3}(L_1)$ | $Y_{N-2}(L_1)$ | $Y_{N-1}(L_1)$ | $Y_N(L_1)$ |
| $Y_1(L_2)$ | $Y_2(L_2)$ | $Y_3(L_2)$ | $Y_4(L_2)$ |
| | ⋮ | | |
| $Y_{N-3}(L_2)$ | $Y_{N-2}(L_2)$ | $Y_{N-1}(L_2)$ | $Y_N(L_2)$ |
| $Cb_1(L_1)$ | $Cr_1(L_1)$ | $Cb_3(L_1)$ | $Cr_3(L_1)$ |
| | ⋮ | | |
| $Cb_{N-3}(L_1)$ | $Cr_{N-3}(L_1)$ | $Cb_{N-1}(L_1)$ | $Cr_{N-1}(L_1)$ |
| $Y_1(L_3)$ | $Y_2(L_3)$ | $Y_3(L_3)$ | $Y_4(L_3)$ |
| | ⋮ | | |
| $Cb_{N-3}(L_{M-1})$ | $Cr_{N-3}(L_{M-1})$ | $Cb_{N-1}(L_{M-1})$ | $Cr_{N-1}(L_{M-1})$ |

FIG.15

| Address Offset | 1st byte | 2nd byte | 3rd byte | 4th byte |
|---|---|---|---|---|
| 00 00 00 00$_{16}$ | Y1(L1) | Y2(L1) | Cb1(L1) | Cr1(L1) |
| 00 00 00 04$_{16}$ | Y3(L1) | Y4(L1) | Cb3(L1) | Cr3(L1) |
| ⋮ | | ⋮ | | |
| 00 00 05 9C$_{16}$ | Y719(L1) | Y720(L1) | Cb719(L1) | Cr719(L1) |
| 00 00 05 A0$_{16}$ | Y1(L2) | Y2(L2) | Cb1(L2) | Cr1(L2) |
| ⋮ | | ⋮ | | |
| 00 0A 8B FC$_{16}$ | Y719(L480) | Y720(L480) | Cb719(L480) | Cr719(L480) |

FIG.16

| Address Offset | 1st byte | 2nd byte | 3rd byte | 4th byte |
|---|---|---|---|---|
| 00 00 00 00$_{16}$ | Y1(L1) | Y2(L1) | Y1(L2) | Y2(L2) |
| 00 00 00 04$_{16}$ | Cr1(L1) | Cr1(L1) | Y3(L1) | Y4(L1) |
| 00 00 00 08$_{16}$ | Y3(L2) | Y4(L2) | Cb3(L1) | Cr3(L1) |
| ⋮ | | ⋮ | | |
| 00 07 E8 F8$_{16}$ | Cb717(L479) | Cr717(L479) | Y719(L479) | Y720(L479) |
| 00 07 E8 FC$_{16}$ | Y719(L480) | Y720(L480) | Cb719(L479) | Cr719(L479) |

FIG.17

| Address Offset | 1st byte | 2nd byte | 3rd byte | 4th byte |
|---|---|---|---|---|
| 00 00 00 00$_{16}$ | Y1(L1) | Y2(L1) | Y3(L1) | Y4(L1) |
| ⋮ | | ⋮ | | |
| 00 00 02 CF$_{16}$ | Y717(L1) | Y718(L1) | Y719(L1) | Y720(L1) |
| 00 00 02 D0$_{16}$ | Cb1(L1) | Cr1(L1) | Cb3(L1) | Cr3(L1) |
| ⋮ | | ⋮ | | |
| 00 00 05 9F$_{16}$ | Cb717(L1) | Cr717(L1) | Cb719(L1) | Cr719(L1) |
| 00 00 05 A0$_{16}$ | Y1(L2) | Y2(L2) | Y3(L2) | Y4(L2) |
| ⋮ | | ⋮ | | |
| 00 0A 8B FC$_{16}$ | Cb717(L480) | Cr717(L480) | Cb719(L480) | Cr719(L480) |

FIG.18

| Address Offset | 1st byte | 2nd byte | 3rd byte | 4th byte |
|---|---|---|---|---|
| 00 00 00 00$_{16}$ | Y1(L1) | Y2(L1) | Y3(L1) | Y4(L1) |
| ⋮ | | ⋮ | | |
| 00 00 02 CF$_{16}$ | Y717(L1) | Y718(L1) | Y719(L1) | Y720(L1) |
| 00 00 02 D0$_{16}$ | Y1(L2) | Y2(L2) | Y3(L2) | Y4(L2) |
| ⋮ | | ⋮ | | |
| 00 00 05 9F$_{16}$ | Y717(L2) | Y718(L2) | Y719(L2) | Y720(L2) |
| 00 00 05 A0$_{16}$ | Cb1(L1) | Cr1(L1) | Cb3(L1) | Cr3(L1) |
| ⋮ | | ⋮ | | |
| 00 00 08 6F$_{16}$ | Cb717(L1) | Cr717(L1) | Cb719(L1) | Cr719(L1) |
| 00 00 08 70$_{16}$ | Y1(L3) | Y2(L3) | Y3(L3) | Y4(L3) |
| ⋮ | | ⋮ | | |
| 00 07 E8 FC$_{16}$ | Cb717(L479) | Cr717(L479) | Cb719(L479) | Cr719(L479) |

FIG.19

|  | msb | | | | | | lsb |
|---|---|---|---|---|---|---|---|
| opcode | \multicolumn{7}{c}{CAPTURE($42_{16}$)} |
| operand [0] | \multicolumn{7}{c}{subfunction:Get_status($04_{16}$)} |
| operand [1] | \multicolumn{4}{c}{source_subunit_type($F_{16}$)} | \multicolumn{3}{c}{source_subunit_ID($F_{16}$)} |
| operand [2] | \multicolumn{7}{c}{source_plug($A0_{16}$)} |
| operand [3] | \multicolumn{7}{c}{status($FF_{16}$)} |
| operand [4] | \multicolumn{7}{c}{dest_plug($00_{16}$)} |
| operand [5] | | | | | | | |
| ⋮ | \multicolumn{7}{c}{print_job_ID} |
| operand [16] | | | | | | | |
| operand [17] | | | | | | | |
| operand [18] | \multicolumn{7}{c}{data_size($FFFFFFFF_{16}$)} |
| operand [19] | | | | | | | |
| operand [20] | | | | | | | |
| operand [21] | \multicolumn{7}{c}{image_size_x($FFFF_{16}$)} |
| operand [22] | | | | | | | |
| operand [23] | \multicolumn{7}{c}{image_size_y($FFFF_{16}$)} |
| operand [24] | | | | | | | |
| operand [25] | \multicolumn{7}{c}{image_format_specifier($FFFF_{16}$)} |
| operand [26] | | | | | | | |
| operand [27] | | | | | | | |
| operand [28] | \multicolumn{7}{c}{reserved($000000_{16}$)} |
| operand [29] | | | | | | | |
| operand [30] | \multicolumn{7}{c}{next_pic($FF_{16}$)} |
| operand [31] | \multicolumn{7}{c}{next_page($FFFF_{16}$)} |
| operand [32] | | | | | | | |

FIG.25

| | msb | | | | | | lsb |
|---|---|---|---|---|---|---|---|
| opcode | \multicolumn{7}{c|}{CAPTURE($42_{16}$)} |
| operand [0] | subfunction:Get_status($04_{16}$) |
| operand [1] | source_subunit_type($F_{16}$) | | | | | source_subunit_ID($F_{16}$) |
| operand [2] | source_plug($A0_{16}$) |
| operand [3] | status($00_{16}$) |
| operand [4] | dest_plug($00_{16}$) |
| operand [5] | print_job_ID |
| ⋮ | |
| operand [16] | |
| operand [17] | data_size($SSSSSSSS_{16}$) next_offset(received_data_size) |
| operand [18] | |
| operand [19] | |
| operand [20] | |
| operand [21] | image_size_x($FFFF_{16}$) |
| operand [22] | |
| operand [23] | image_size_y($FFFF_{16}$) |
| operand [24] | |
| operand [25] | image_format_specifier($FFFF_{16}$) |
| operand [26] | |
| operand [27] | reserved($000000_{16}$) |
| operand [28] | |
| operand [29] | |
| operand [30] | next_pic($NN_{16}$) |
| operand [31] | next_page($PPPP_{16}$) |
| operand [32] | |

FIG.26

| | msb | | | | | | lsb |
|---|---|---|---|---|---|---|---|
| opcode | \multicolumn{7}{c|}{CAPTURE($42_{16}$)} |
| operand [0] | \multicolumn{7}{c|}{subfunction:Get_restore($02_{16}$)} |
| operand [1] | \multicolumn{4}{c|}{source_subunit_type($F_{16}$)} | \multicolumn{3}{c|}{source_subunit_ID($F_{16}$)} |
| operand [2] | \multicolumn{7}{c|}{source_plug($A0_{16}$)} |
| operand [3] | \multicolumn{7}{c|}{status($FF_{16}$)} |
| operand [4] | \multicolumn{7}{c|}{dest_plug($00_{16}$)} |
| operand [5] | | | | | | | |
| : | \multicolumn{7}{c|}{print_job_ID} |
| operand [16] | | | | | | | |
| operand [17] | | | | | | | |
| operand [18] | \multicolumn{7}{c|}{data_size($SSSSSSSS_{16}$)} |
| operand [19] | | | | | | | |
| operand [20] | | | | | | | |
| operand [21] | \multicolumn{7}{c|}{image_size_x($XXXX_{16}$)} |
| operand [22] | | | | | | | |
| operand [23] | \multicolumn{7}{c|}{image_size_y($YYYY_{16}$)} |
| operand [24] | | | | | | | |
| operand [25] | \multicolumn{7}{c|}{image_format_specifier($IIII_{16}$)} |
| operand [26] | | | | | | | |
| operand [27] | | | | | | | |
| operand [28] | \multicolumn{7}{c|}{reserved($000000_{16}$)} |
| operand [29] | | | | | | | |
| operand [30] | \multicolumn{7}{c|}{next_pic($FF_{16}$)} |
| operand [31] | \multicolumn{7}{c|}{next_page($FFFF_{16}$)} |
| operand [32] | | | | | | | |

FIG.27

| | msb | | | | | | lsb |
|---|---|---|---|---|---|---|---|
| opcode | colspan="7" | CAPTURE($42_{16}$) |
| operand [0] | colspan="7" | subfunction: interm($0F_{16}$) |
| operand [1] | colspan="4" | source_subunit_type($F_{16}$) | colspan="3" | source_subunit_ID($F_{16}$) |
| operand [2] | colspan="7" | source_plug($A0_{16}$) |
| operand [3] | colspan="7" | status($FF_{16}$) |
| operand [4] | colspan="7" | dest_plug($00_{16}$) |
| operand [5] | colspan="7" rowspan="3" | print_job_ID |
| ⋮ | |
| operand [16] | |
| operand [17] | colspan="7" rowspan="4" | data_size($SSSSSSSS_{16}$) |
| operand [18] | |
| operand [19] | |
| operand [20] | |
| operand [21] | colspan="7" rowspan="2" | image_size_x($XXXX_{16}$) |
| operand [22] | |
| operand [23] | colspan="7" rowspan="2" | image_size_y($YYYY_{16}$) |
| operand [24] | |
| operand [25] | colspan="7" rowspan="2" | image_format_specifier($IIII_{16}$) |
| operand [26] | |
| operand [27] | colspan="7" rowspan="3" | reserved($000000_{16}$) |
| operand [28] | |
| operand [29] | |
| operand [30] | colspan="7" | next_pic($FF_{16}$) |
| operand [31] | colspan="7" rowspan="2" | next_page($FFFF_{16}$) |
| operand [32] | |

FIG.28

|  | msb | | | | | | lsb |
|---|---|---|---|---|---|---|---|
| opcode | colspan="7" | CAPTURE($42_{16}$) |
| operand [0] | colspan="7" | subfunction: accepted($09_{16}$) |
| operand [1] | colspan="4" | source_subunit_type($F_{16}$) | colspan="3" | source_subunit_ID($F_{16}$) |
| operand [2] | colspan="7" | source_plug($A0_{16}$) |
| operand [3] | colspan="7" | status($00_{16}$) |
| operand [4] | colspan="7" | dest_plug($00_{16}$) |
| operand [5] | | | | | | | |
| ⋮ | colspan="7" | print_job_ID |
| operand [16] | | | | | | | |
| operand [17] | | | | | | | |
| operand [18] | colspan="7" | data_size($SSSSSSSS_{16}$) |
| operand [19] | | | | | | | |
| operand [20] | | | | | | | |
| operand [21] | colspan="7" | image_size_x($XXXX_{16}$) |
| operand [22] | | | | | | | |
| operand [23] | colspan="7" | image_size_y($YYYY_{16}$) |
| operand [24] | | | | | | | |
| operand [25] | colspan="7" | image_format_specifier($IIII_{16}$) |
| operand [26] | | | | | | | |
| operand [27] | | | | | | | |
| operand [28] | colspan="7" | reserved($000000_{16}$) |
| operand [29] | | | | | | | |
| operand [30] | colspan="7" | next_pic($NN_{16}$) |
| operand [31] | colspan="7" | next_page($PPPP_{16}$) |
| operand [32] | | | | | | | |

FIG.29

| | (a) STATUS command | (b) STABLE response | (c) STATUS response | (d) STATUS response |
|---|---|---|---|---|
| operands | | | | |
| subfunction | get_status | ↓ | ↓ | ↓ |
| source_subunit_type, source_subunit_ID, source_plug | $FF_{..16}$ | ↓ | ↓ | ↓ |
| status | $FF_{16}$ | $00_{16}$(finished) | $00_{16}$(finished) | $00_{16}$(receiving) |
| print_job_ID | controller eui/record id | ↓ | ↓ | ↓ |
| data_size, image_size_x, image_size_y, image_format_specifier, | $FF_{..16}$ | ↓ | ↓ | ↓ |
| next_pic | $FF_{16}$ | $01_{16}$ | $00_{16}$ | $00_{16}$ |
| next_page | $FFFF_{16}$ | $01_{16}$ | $01_{16}$ | $01_{16}$ |

FIG.32

PRINTING DATA AND PICTURE DATA TRANSFERRING METHOD

TECHNICAL FIELD

This invention relates to a printing apparatus, a printing control apparatus, a printing system, a printing method, a printing control method and to a picture data transferring method usable with advantage in a system for printing an image by a printer connected in circuit via an interface conforming to the IEEE (The Institute of Electrical and Electronics Engineers)1394 standard.

BACKGROUND ART

The IEEE (The Institute of Electrical and Electronics Engineers)1394 standard provides for physical and electrical standards of connectors provided on interconnection to respective equipments. The equipments having interfaces conforming to the IEEE 1394 standard can be physically interconnected to realize e.g., Hot Plug and Play adapted for automatically transmitting/receiving digital data speedily and for establishing interconnection among different equipment. This is currently being accepted as a serial interface standard providing a criterium for the pertinent business circles.

It has recently been proposed in 1394 TRADE ASSOCIATION to receive printing data from an external network circuit by a set top box (STB) to print the data by a printer connected to the STB over the IEEE 1394 cable.

Up to now, if printing data received by the STB is to be printed by a printer, the processing shown in FIG. 1 is carried out between the STB and the printer device.

In FIG. 1, the STB sends a command packet C101, having stored therein an ALLOCATE command, for setting a destination plug, and receives a corresponding response packet R101.

The STB then sends a command packet C102, having stored therein an ATTACH command, indicating setting a source plug to effect transmission/reception of a data packet, and receives a corresponding response packet R102.

The STB then transmits to the printer a command packet C103, having stored therein a capture command indicating start of printing, and receives a corresponding response packet R102.

The printer then sends a packet S103, having the information of the mode setting the oAPR (output Asynchronous Port Register) to the STB, from which data transmission to the printer is initiated.

If bus resetting occurs during data transmission, the STB sends a command packet C104 for restoring a port to the printer, and receives a corresponding response packet R104. Thus, the STB and the printer send a packet S102 including the oAPR having the information of the mode for restoring the asynchronous connection prior to bus resetting occurrence. The STB then is responsive thereto to start the processing of transmitting the printing data again. The printer device is responsive to reception of the packet S103 having the information pertinent to the iAPR (input asynchronous port register) of the flow control register of the source plug to transmit a packet S104 indicating the completion of data reception to the STB.

If, in the STB and the printer, performing the processing shown in FIG. 1, bus resetting occurs during transmission of printing data, the printing data sent from the STB to the printer before the occurrence of the bus resetting is erased to transmit the initial printing data again. However, in data transmission conforming to the IEEE 1394 standard, bus resetting occurs unavoidably and frequently even as a result of cable connection or disconnection.

So, if, in conventional processing, bus resetting occurs when transmitting an HD (high definition) image produced by e.g., a high definition television (HDTV) from the STB to the printer for printing, much more time is consumed. That is, an HD image has a data size of several M bytes and, if transmission of printing data is again started from the beginning portion on occurrence of bus resetting, considerable data transmission time is consumed, thus protracting the entire printing time inclusive of the data transmission time and printing processing time.

The present Applicant proposed the contents of the Japanese Patent Applications No.H11-350866 and No. H11-345471, which are the bases of priority of the present application, to the IEEE 1394 Trade Association for standardization at suitable timing, and the contents of the proposal are made public as the following drafts by the IEEE 1394 Trade Association:

AV/C Printer Subunit Specification Version 1.0, Draft 0.97:60 (2Q00 AVWG Off-Cycle Meeting on May 24–25, 2000);

AV/C Printer Subunit Specification Version 1.0, Draft 0.7:5 (1Q00 TA QM AV-WG on Jan. 18, 2000); and AV/C Printer Subunit Specification Version 1.0, Draft 0.5:145 (3Q99 TA QM AVWG Meeting on Jul. 28–30, 1999).

DISCLOSURE OF THE INVENTION

It is therefore an object of the present invention to provide a printing apparatus, a printing control apparatus, a printing system, a printing method and a printing control method in which, even if bus resetting occurs, data can be transmitted in, a shorter time to render it possible to diminish the entire printing time.

It is another object of the present invention to provide a picture data transferring method and a picture data receiving method in which, even if bus resetting occurs, data can be transmitted in a shorter time to render it possible to diminish the entire time of transferring picture data.

In one aspect, the present invention provides a printing device including printing means for performing printing using printing data from a printing control device, input/output means for being fed from the printing control device with printing data comprehended in a packet conforming to the IEEE (The Institute of Electrical and Electronics Engineers)1394 standard, and for outputting a response packet responsive to a command packet conforming to the IEEE 1394 standard from the printing control device, and control means for controlling the input/output means for outputting the information, pertinent to the printing data, input by the input/output means before occurrence of bus resetting between the input/output means and the printing control device when such bus resetting occurs during inputting the printing data by the input/output means, to the printing control device. The control means controls the printing means to perform printing processing using printing data input by the input/output means.

In another aspect, the present invention provides a printing method for performing printing using printing data from a printing control device, including a step of outputting a response packet responsive to a command packet, conforming to the IEEE (The Institute of Electrical and Electronics Engineers) 1394 standard, input from the printing control device, a step of receiving from the printing control device the printing control data comprehended in a packet conforming to the IEEE 1394 standard, a step of managing control to output to the printing control device the information pertinent to the printing data, as received prior to occurrence of bus resetting, in case such bus resetting occurs with respect to the printing control device as the printing data is input, and a step of performing the printing using the input printing data.

In still another aspect, the present invention provides a printing control device including picture processing means for processing picture signals output from outside to generate printing data, input/output means for comprehending printing data generated by the picture processing means in a packet conforming to the IEEE (The Institute of Electrical and Electronics Engineers)1394 standard, and for outputting the picture data comprehended in the packet to a printing device, and control means for requesting the printing device to transmit the information pertinent to the printing data, output by the input/output means before occurrence of bus resetting between the input/output means and the printing control device when such bus resetting occurs during outputting the printing data by the input/output means. The control means controls the input/output means to perform the processing of re-outputting the printing data based on the information output from the printing device so as to be input by the input/output means.

In still another aspect, the present invention provides a printing control method for processing picture signals input from outside to generate printing data; including a step of comprehending the printing data generated on processing the picture signals in a packet conforming to the IEEE (The Institute of Electrical and Electronics Engineers)1394 standard to output the printing data comprehended in the packet to a printing device, a step of requesting the printing device to transmit the information pertinent to the printing data, output before occurrence of bus resetting with respect to the printing control device when such bus resetting occurs during outputting the printing data, and a step of managing control to perform the processing of re-outputting the printing data, based on the information pertinent to the printing data output from the printing device.

In still another aspect, the present invention provides a printing system including a printing control device having picture processing means for processing picture signals output from outside to generate printing data, first input/output means for comprehending printing data generated by the picture processing means in a packet conforming to the IEEE (The Institute of Electrical and Electronics Engineers) 1394 standard, and for outputting the picture data comprehended in the packet to a printing device and control means for controlling the first input/output means, and a printing device having printing means for controlling the first input/output means and second input/output means for receiving the printing data from the printing control device and for outputting a response packet responsive to a command packet from the printing control device. The first input/output means requests the printing device to transmit the information output before occurrence of bus resetting between the input/output means and the printing control device when such bus resetting occurs during transmission of the printing data from the first input/output means to second input/output means. The second input/output means outputs the information input before occurrence of the bus resetting responsive to the request from the first input/output means to the first input/output means. The first input/output means re-outputs printing data based on the information output by the second input/output means.

In another aspect, the present invention provides a printing method including transmitting printing data from first input/output means comprised in a transmission device to second input/output means comprised in a printing device and requesting the printing device to transmit the information output by the first input/output means before occurrence of bus resetting between the transmission device and the printing device if such bus resetting occurs during transmission of the printing data, outputting the information input before occurrence of bus resetting responsive to a request made by the first input/output means, from the second input/output means to the first input/output means, re-outputting the printing data from the first input/output means to the second input/output means, based on the information input responsive to such request, to perform the printing on the printing device using the printing data.

In still another aspect, the present invention provides a picture data transferring method for processing picture signals input from outside to generate picture data to be transferred, including a step of outputting the picture data generated on processing the picture signals to a reception device as the printing data is comprehended in a packet conforming to the IEEE (The Institute of Electrical and Electronics Engineers)1394 standard, a step of requesting the reception device to transmit the information pertinent to the picture data, output before occurrence of bus resetting with respect to the reception device when such bus resetting occurs during outputting the printing data and a step of managing control to perform the processing of re-outputting the printing data, based on the information on the printing data output from the reception device. At least one of the data position information, printing page information and the printing picture information, derived from the data size of data received by the reception device, responsive to the information pertinent to the printing data, input before occurrence of bus resetting, is input, while printing data as from the printing data not received by the reception device due to interruption by the bus resetting is output to the printing device.

In yet another aspect, the present invention provides a picture data receiving method for receiving picture data from a picture data transferring device, including a step of outputting a response packet responsive to a command packet conforming to the IEEE (The Institute of Electrical and Electronics Engineers)1394 standard, input from the picture data transferring device, a step of receiving the picture data, comprehended in a packet conforming to still image data IEEE 1394 standard, from the picture data transferring device and a step of managing control so that, if bus resetting occurs with respect to the picture data transferring device during inputting the picture data, the information of the picture data input before occurrence of bus resetting is output to the picture data transferring device will be output to the picture data transferring device. Control is managed so that, as the information pertinent to the picture data input before occurrence of the bus resetting, at least one of the data position information, printing page information and the printing picture information, derived from the data size of received data, will be output to the picture data transferring device. The printing data as from the printing data not received by the reception device due to interruption by the bus resetting is received for processing.

BRIEF DESCRIPTION OF THE DRAWINGS

FIG. 7 illustrates an image type of a still image.

FIG. 8 illustrates a data structure of a capture command included in a command packet.

FIG. 9 illustrates the contents stored in a subfunction.

FIG. 10 illustrates the appellation of an image type stored in the image_format_specifier.

FIG. 11 illustrates another example of an image type stored in the image_format_specifier.

FIG. 12 illustrates the transmission order of pixel data in point-sequential transmission of static image data with a pixel format of YCC 4:2:2 to the printer device.

FIG. 13 illustrates the transmission order of pixel data in point-sequential transmission of static image data with a pixel format of YCC 4:2:0 to the printer device.

FIG. 14 illustrates the transmission order of pixel data in line-sequential transmission of static image data with a pixel format of YCC 4:2:2 to the printer device.

FIG. 15 illustrates the transmission order of pixel data in line-sequential transmission of static image data with a pixel format of YCC 4:2:0 to the printer device.

FIG. 16 illustrates how a still picture with an image type of 480_422_4×3 is transmitted point-sequentially.

FIG. 17 illustrates how a still picture with an image type of 480_422_4×3 is transmitted point-sequentially.

FIG. 18 illustrates how a still picture with an image type of 480_422_4×3 is transmitted line-sequentially.

FIG. 19 illustrates how a still picture with an image type of 480_422_4×3 is transmitted line-sequentially.

FIG. 25 shows a data structure of a capture command inquiring the state of the printing device after occurrence of bus resetting in the picture printing system embodying the present invention.

FIG. 26 illustrates a data structure of a response to the capture command shown in FIG. 25.

FIG. 27 illustrates a data structure of a capture command for re-initiating data transmission processing after occurrence of bus resetting in the picture printing system embodying the present invention.

FIG. 28 illustrates a data structure of a response to the capture command shown in FIG. 27.

FIG. 29 illustrates another typical dat structure of a response to the capture command shown in FIG. 27.

FIG. 32 illustrates contents transmitted/received between the data outputting unit and the data inputting unit in re-initiating data transmission.

BEST MODE FOR CARRYING OUT THE INVENTION

Figure 1:
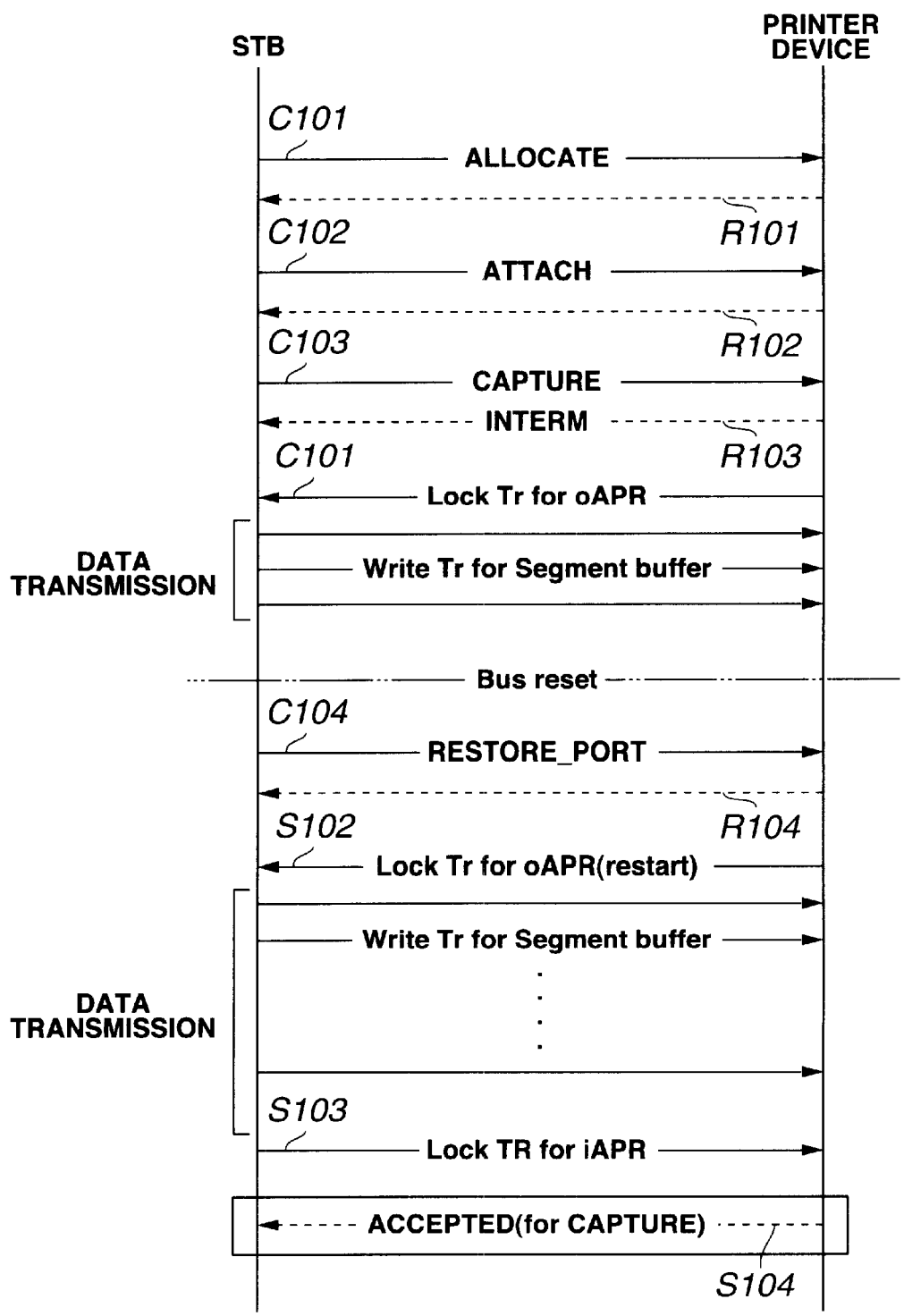
FIG. 1 is a flowchart for illustrating the processing of transmitting data from an STB to a printing device in printing the printing data received by an STB on the printing device.

Referring to the drawings, preferred embodiments according to the present invention will be explained in detail.

Figure 2:
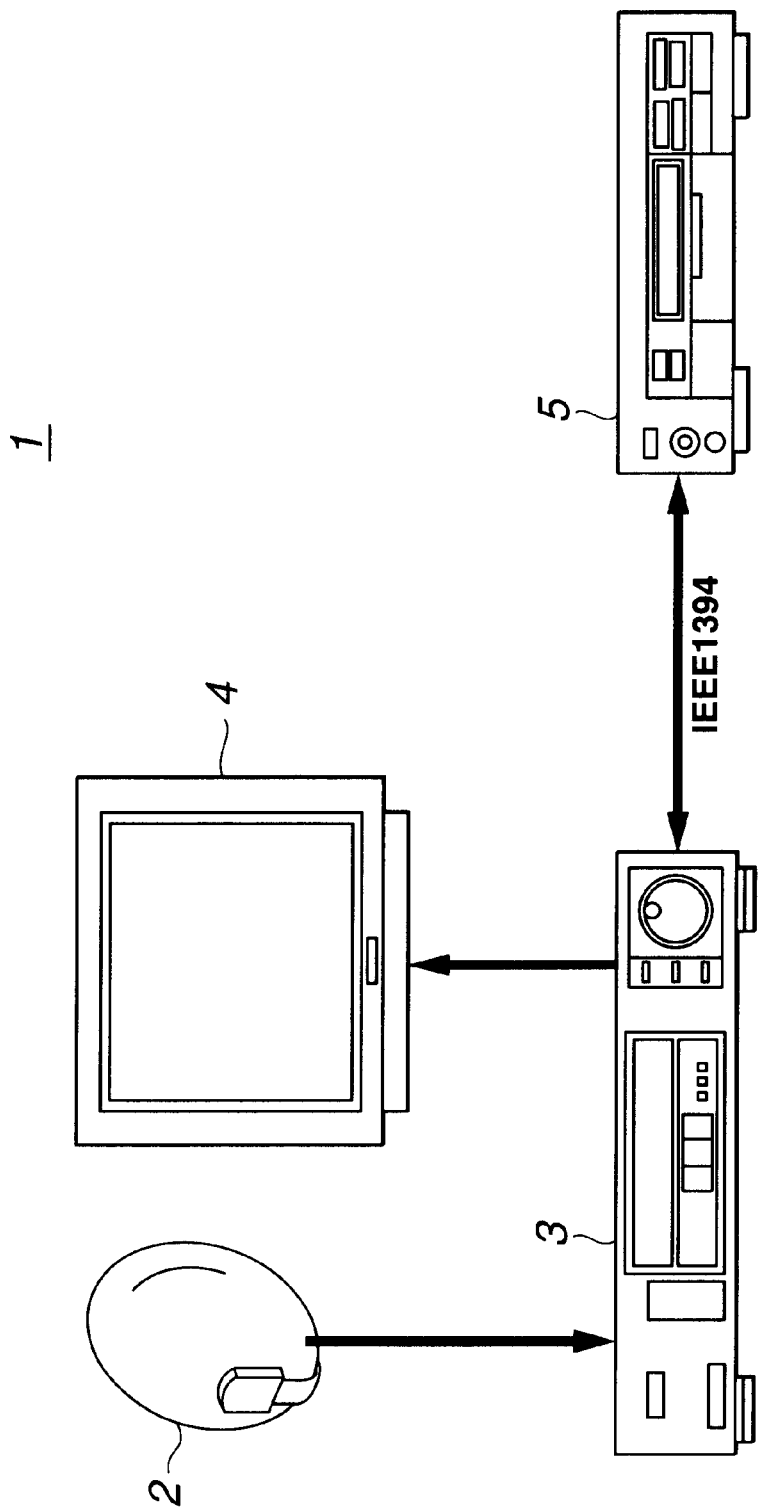
FIG. 2 illustrates a picture printing system embodying the present invention.

A picture printing system embodying the present invention is configured as shown for example in FIG. 2.

This picture printing system 1 is made up of an antenna 2 for receiving a moving picture broadcast using e.g., a communication satellite, a set top box (STB) 3 for performing pre-set signal processing on received moving picture data, a television device 4 for demonstrating a moving picture and a still picture and a printing device 5 for printing and outputting a picture.

The antenna 2 receives picture signals representing a moving picture to output the received picture signals to the STB 3. The picture signals, received over the antenna 2, are made up of multi-channel picture signals, superimposed together. More specifically, the picture signals are comprised of moving picture data compressed in accordance with e.g., MPEG (Moving Picture Experts Group) and encrypted in accordance with a pre-set encryption system.

The television device 4 is fed through the STB 3 with moving picture data of the NTSC (National television System Committee) system to display a moving picture. Moreover, in case of an HDTV, the television device 4 is fed from the STB 3 with moving picture data conforming to the HD (High Definition) standard to display a moving picture. Moreover, the television device 4 has its display state controlled by the STB 3 to display a still picture or other teletext information.

Figure 3:
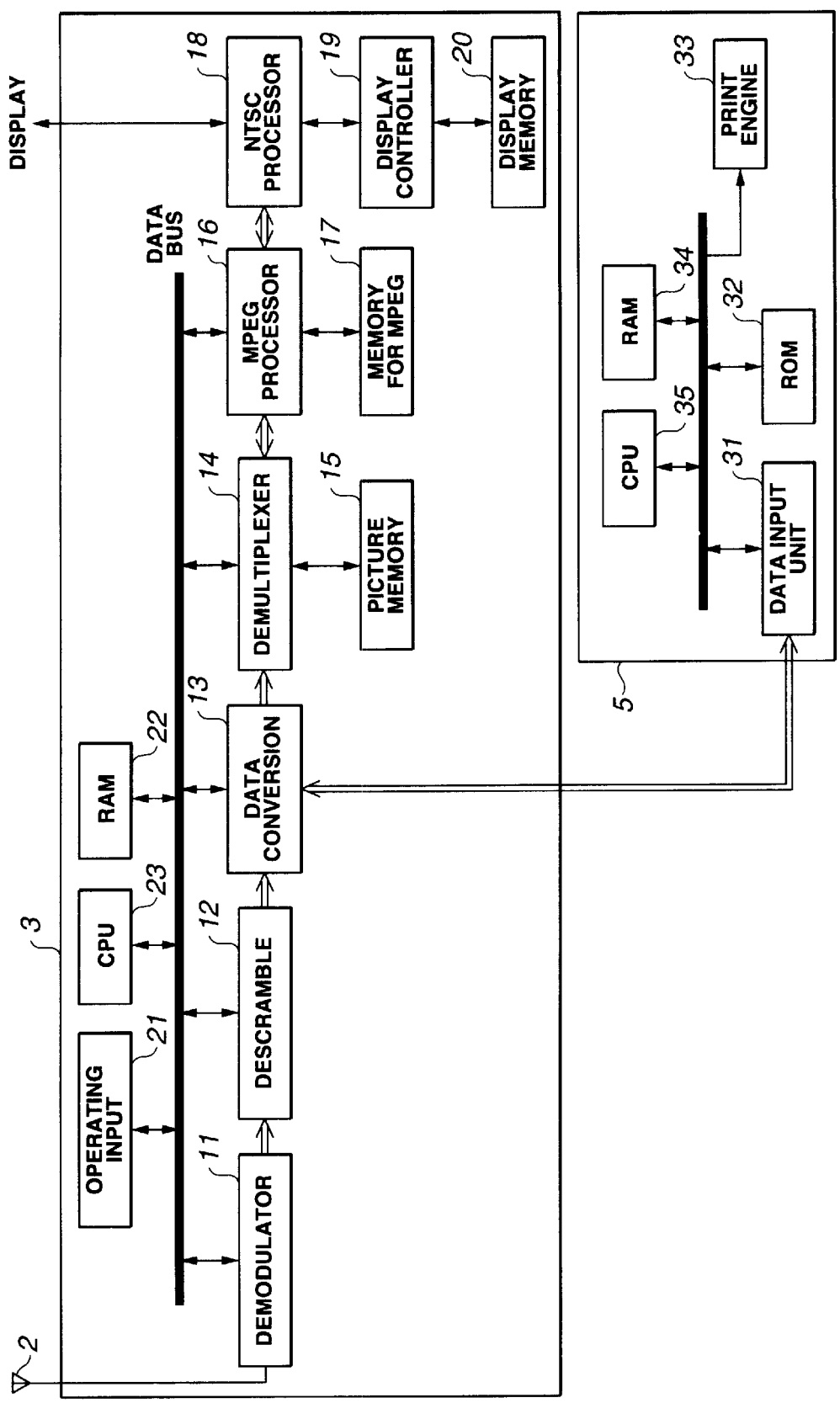
FIG. 3 is a block diagram showing the structure of an STB and a printer device making up a picture printing system embodying the present invention.

Referring to FIG. 3, the STB 3 includes a demodulator 11 for demodulating picture signals received over the antenna 2, a descrambler 12 for decoding the moving picture data, a data conversion unit 13 for doing data conversion conforming to the IEEE 1394 standard, a demultiplexer 14 for doing the processing such as extracting moving picture data in a pre-set channel, a picture memory 15, an MPEG processor 16 for doing e.g., decoding, an NTSC encoder 18 for doing conversion to data displayed on a screen in the television device 4, and a display controller 19. The STB 3 also includes an operating input unit 21, fed with a command by a user, a RAM (random access memory) 22 and a central processing unit (CPU) 23 for controlling various units.

In this STB 3, the demodulator 11, descrambler 12, data conversion unit 13, demultiplexer 14, MPEG processor 16, operating input unit 21, RAM (random access memory) 22 and the CPU 23 are connected to a bus, over which the processing operations of various components are controlled by the CPU 23.

The demodulator 11 is fed from the antenna 2 with picture signals of the analog system indicating e.g., a moving picture stream. This demodulator 11 performs demodulation and A/D (analog to digital) conversion on the picture signals from the antenna 2 to output the resulting signals to the descrambler 12 as moving picture data. The demodulator 11, is also fed over a bus with control signals from the CPU 23 to perform the demodulation and the A/D conversion based on these control signals.

The descrambler 12 decodes the moving picture data from the demodulator 11. That is, the descrambler 12 is fed with encrypted moving picture data to perform decoding in accordance with the encryption system of the input moving picture data. The descrambler 12 outputs the decoded moving picture data to the data conversion unit 13. The descrambler 12 is fed over the bus with control signals from the CPU 23 and performs decoding using the encryption key contained in the control signals.

The data conversion unit 13 is comprised e.g., of an interfacing circuit conforming to the IEEE 1394 standard and is responsive to the control signal from the CPU 23 to perform signal processing conforming to the IEEE 1394 standard on the moving picture data from the descrambler 12 to perform the processing of including the input moving or still picture data into a packet conforming to the IEEE 1394 standard. If temporally continuous data, such as moving picture data, is to be transmitted, the data conversion unit 13 generates an isochronous packet, whereas, if still picture data for printing by the printing device 5 or still data such as commands or data for connection setting, the data conversion unit 13 performs the processing of generating an asynchronous packet 100.

Figure 4:
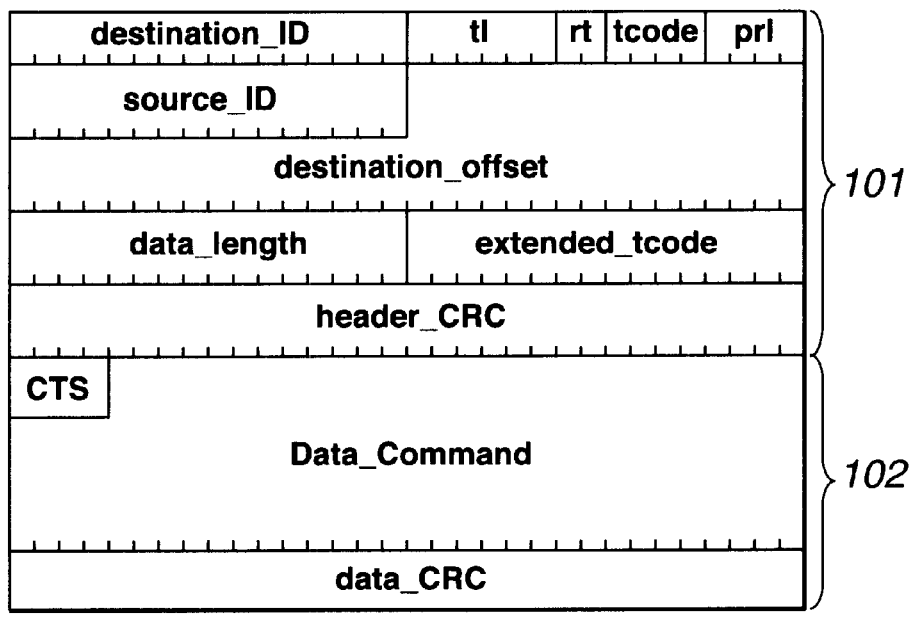
FIG. 4 illustrates a data structure of an asynchronous packet transmitted/received between an STB and a printing device.

The asynchronous packet 100, shown in FIG. 4, includes a header 101 and a data part 102 conforming to the IEEE 1394 standard.

In the header 101 are stored an ID on the packet receiving side, that is an ID of the printing device 5 (destination_ID), a transaction label (tl: transaction label), a retry code (rt: retry code), a transaction code (tcode: transaction code), priority (pri: priority), an ID on the packet transmitting side, that is source ID indicating an ID of the STB 3 (source_ID), destination_offset, indicating a memory address on the packet receiving side, a data field length (data_length), extended transaction code (extended_tcode), and a header CRC (header_CRC: CRC of the header field) for the header part 101.

In the data part 102, there are stored a data field, in which to store data in accordance with FCP (function control protocol) and with AV/C protocol, and a data CRC (data_CRC) indicating the CRC for the header part 102.

In the data field are stored, as the information conforming to FCP, a command transaction set (CTS), a command type (c:type), a subunit type (subunit_type) indicating the sort of the sub-unit on the packet receiving side, and a sub-unit ID indicating the packet receiving side sub-unit (subunit_ID). To a sub-unit on the packet receiving side corresponds a data input unit 31 of the printing device 13. The kind of the sib-units on the packet receiving side is represented as "00010" for the printing device 5.

Next to the subunit ID, the opcode, indicating the sort of the operations, and the operands [0] to [n], indicating an object of the operations, are stored, in the data field, in order to store an AV/C command for the printing device 5. In these operands are stored still picture data (data) transmitted to the printing device 5 and AV/C commands for the printing device 5. The commands stored in the data field are those comprehended in a command set, termed AV/C commands, used for controlling the printing device 5. The above-mentioned CTS classifies the FCPs, so that, if a transmitted packet is a command, and has a value of 0000, an AV/C command, defined in the AV/C Digital Interface Command Set of the IEEE 1394, is stored in the data part 102.

When outputting an isochronous packet to outside, the data conversion unit 13 transmits isochronous packets at regular intervals.

Figure 6:
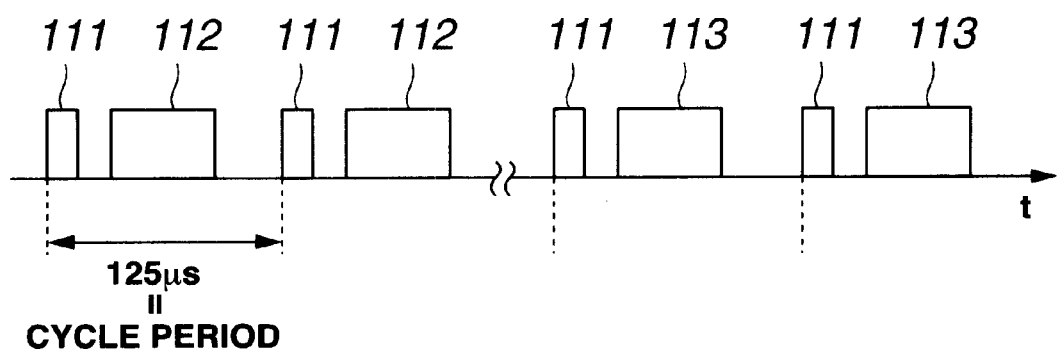
FIG. 6 is a timing chart in transmitting an asynchronous packet from a data outputting unit to a data inputting unit.

If the data conversion unit 13 transmits an asynchronous packet 100 as still picture data for printing by the printing device 5 comprehended therein, it transmits the asynchronous packet 100 at a cycle period of 125 $\mu$sec, as shown in FIG. 6. It is noted that the data conversion unit 13 first transmits a cycle start packet 111, which is an asynchronous packet 100 comprehending cycle time data (cycle_time_data) indicating a cycle start (cycle_start) in a header part 101 and, after lapse of a pre-set time gap, transmits a command packet 112 comprehending in a data part 102 a capture command indicting the purport of transmitting e.g., still picture data. The data conversion unit 13 then transmits, at each cycle period, a data packet 113, having still picture data stored in its data part 102, to the printing device 5 which has received the capture command.

It is noted that, when outputting still picture data to the printing device 5, the data conversion unit 13 observes the asynchronous arbitration. That is, when outputting still picture data to the printing device 5, the data conversion unit 13 transmits each asynchronous packet 100, inclusive of the still picture data, in accordance with the response from the printing device 5.

Specifically, the data conversion unit 13 performs the processing in the transaction layer, link layer and in the physical layer, under serial bus supervision conforming to the IEEE 1394 standard. So, the data conversion unit 13 establishes the interconnection to the printing device 5, under control by the CPU 23, while generating an asynchronous packet 100, inclusive of the still picture data and the overhead as the control information, and transmitting asynchronous packets 100 to the printing device 5, connected thereto in accordance with the IEEE 1394 standard, every cycle period, by way of performing time division control.

When directly displaying moving picture data, received by the STB 3, that is without performing the processing conforming to the IEEE 1394 standard by the television device 4, the data conversion unit 13 outputs the moving picture data from the descrambler 12 to the demultiplexer 14, based on the control signal from the CPU 23.

The demultiplexer 14 performs a channel sorting processing of sorting out a channel specified by the CPU 23, from plural channels superposed on moving picture data from the data conversion unit 13, to output only the moving picture data, indicating the specified channel, to the MPEG processor 16.

The demultiplexer 14 is fed with still picture data, made up of the luminance information and the chroma information, from the MPEG processor 16, under control by the CPU 23, memorizes the still picture data in the picture memory 15 and outputs the stored data to the data conversion unit 13 under control by the CPU 23.

Based on the control signal from the CPU 23, the MPEG processor 16 performs decoding processing, in accordance with the MPEG standard, on the moving picture data from the demultiplexer 14, to output the resulting non-compressed moving picture data to the NTSC encoder 18. So, the MPEG processor 16 formulates a picture, comprised of pixel data, including the luminance information (Y) and chroma information (Cr, Cb), referred to below as a YCC picture, from respective frames making up a moving picture. It is noted that the MPEG processor 16 incidentally stores plural frame-based moving picture data, as an object of decoding, in a memory for MPEG 17, for use as a work area.

The MPEG processor 16 generates the YCC picture of a pixel format such that the sampling frequency ratio of the luminance information Y, chroma information Cr and the chroma information Cb is set to 4:2:2, that is such that the chroma information Cr, Cb is reduced in the horizontal or vertical direction to one half of the luminance information Y. Also, the MPEG processor 16 generates a YCC picture of a 4:2:0 pixel format such that the chroma information Cr, Cb is reduced in both the horizontal and vertical directions to one half of the luminance information Y. It is noted that, in the 4:2:0 pixel format, the odd line is devoid of the chroma information Cb to give a sampling frequency ratio of 4:2:0, while the even line is devoid of the chroma information Cr to give a sampling frequency ratio of 4:0:2. This format, however, is expressed as 4:2:0 which is the former ratio. It is possible for the MPEG processor 16 to generate a YCC picture not only of the pixel format of 4:2:2 or 4:2:0 but also of the pixel format of 4:4:4 in which the chroma information is-not curtailed.

The MPEG processor 16 also performs the encoding processing, conforming to the MPEG standard, on the moving picture data from the NTSC encoder 18, based on the control signal representing e.g., the compression ratio from the CPU 23, to compress the moving picture data in the temporal and spatial directions, to output the resulting compressed data to the demultiplexer 14. The MPEG processor 16 performs the processing of storing plural-frame-based moving picture data for encoding processing in the memory for MPEG 17.

The NTSC encoder 18 performs encoding processing to formulate moving picture data of the NTSC system, which can be displayed on a screen by the television device 4, from the moving picture data input from the MPEG processor 16, to output the resulting data on the television device 4.

The display controller 19 performs the processing of displaying the moving picture data of the NTSC system by the NTSC encoder 18 on the television device 4. At this time, the display controller 19 incidentally stores the data for processing in a display memory 20.

Specifically, the display controller 19 performs the processing of providing a picture size for display with 720 by 480 pixels of the NTSC system or the 1920 horizontal pixels by 1080 vertical pixels of the HD (high definition) system, depending on the television device 4, as a picture size for display on the television device 4, in terms of a frame constituting moving picture data as a unit. In generating one-pixel data, the display controller 19 performs the processing of outputting the 16-bit information with the pixel format in which the sampling frequency ratio of the luminance signal Y, chroma signals Cr and the chroma signals Cb is set to 4:2:2, or the information with the pixel format in which the sampling frequency ratio of the luminance signal Y, chroma signals Cr and the chroma signals Cb is set to 4:2:0, to the television device 4.

The display controller 19 may be used not only in case the above-described system of outputting to the television device 4 is used, but also in case a picture of the image type, in which the picture size (pixel_x, pixel_y), the scanning system (interlace/progressive), pixel format (pixel_format), screen aspect ratio (screen_aspect_ratio), pixel aspect ratio and the image size are defined, is to be produced. In FIG. 7, such an image type in which the pixel_y is 720 pixels, the pixel format is 4:2:2 and the screen aspect ratio is 16:9, is termed 720_422_16×9. It is noted that the display controller 19 is also able to generate a picture of 720_422_16×9 and 720_420_16×9, as image types of the digital TV broadcast system used in USA, and to generate a picture of 576_422_4×3 and a picture of 522_420_4×3 as image types of the PAL (phase alternation by line) system.

On user actuation of e.g., an actuating button provided on the STB 3, the operating input unit 21 generates an operating input signal to output the generated signal to the CPU 23. Specifically, the operating input unit 21 transiently halts the moving picture displayed by the user on the television device 4 to generate an operating input signal for printing a still picture by the printing device 5.

Based on e.g., an operating input signal from the operating input unit 21, the CPU 23 generates a control signal for controlling the above-mentioned various parts making up the STB 3.

When the picture signals received e.g., over the antenna 2 are to be displayed on the television device 4, the CPU 23 outputs control signals to the demodulator 11, descrambler 12, data conversion unit 13, demultiplexer 14 and to the MPEG processor 16 to manage control to demodulate and decrypt moving picture data, perform channel sorting processing on and to decode the moving picture data in accordance with the MPEG standard.

If frame-based still pictures, among the moving pictures displayed on the television device 4 by the operating input signal from the operating input unit 21, are to be captured, the CPU 23 generates control signals to read in the frame-based still picture data, stored in the display memory 20 at a time point of inputting of the operating input signal, into the picture memory 15.

If an operating input signal for printing a picture generating the still picture data by the printing device 5 is input, the CPU 23 controls the demultiplexer 14 and the data conversion unit 13 to output the YCC picture, made up of the luminance information Y and the chroma information Cr, Cb, and which is the frame-based still picture data stored in the picture memory 15, to the printing device 5 through the data conversion unit 13, which is an interfacing circuit conforming to the IEEE 1394 standard.

Figure 5:
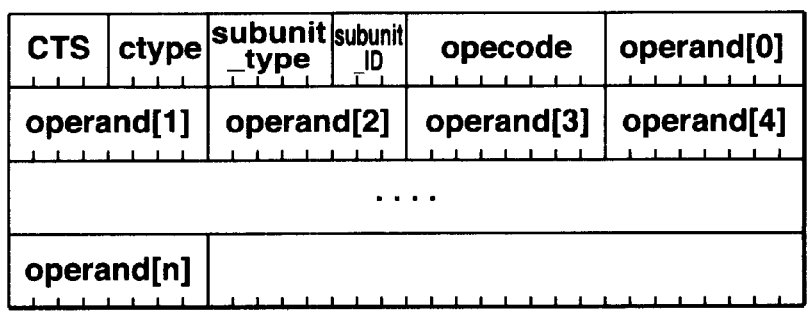
FIG. 5 shows a data structure of a data unit of an asynchronous packet.

If still picture data is to be transmitted to the printing device 5, under control by the CPU 23, the data conversion unit 13 transmits, next to the subunit ID shown in FIG. 5, the asynchronous packet 100, having stored therein a capture command as later explained with reference to FIG. 8, to transmit a capture command for receiving the still picture data to the printing device 5.

Next, the printing device 5 is explained.

Referring to FIG. 3, the printing device 5 includes a data input unit 31 for inputting still picture data from the printing device 5, a ROM (read-only memory) 32, having stored therein the printing control program, a print engine 33 for printing on a support, a RAM 34, and a CPU 35 for controlling various components.

The data input unit 31 is comprised of an interfacing circuit conforming e.g., to the IEEE 1394 standard and, responsive to a control signal from the CPU 35, performs signal processing conforming to the IEEE 1394 standard on still picture data comprehended in the asynchronous packet 100 from the STB 3.

Specifically, the data input unit 31 performs processing in a transaction layer, a link layer and in a physical layer, under serial bus management conforming to the IEEE 1394 standard. This permits the data input unit 31 to output still picture data comprehended in the asynchronous packet 100 to the CPU 35.

The data input, unit 31 also performs the setting for interconnection for. transmitting/receiving the asynchronous packet 100 between it and the printing device 5, with the data conversion unit 13 of the STB 3, such as when the data input unit 31 is mechanically coupled to the STB 3 over e.g., an optical cable.

The print engine 33 is made up of a printing support holding/driving mechanism, a printer head, a printer head driving mechanism and so forth, and prints a still picture on the support, under control by the CPU 35.

The CPU 35 generates a control signal for controlling the data input unit 31 and the print engine 33. At this time, the CPU 35 operates in accordance with a printing control program stored in the ROM 32, while controlling the contents of the RAM 34, using the RAM 34 as a working area.

Referring to FIG. 8, the capture command, generated by the data conversion unit 13 and transmitted to the data input unit 31, is explained with reference to FIG. 8.

In a capture command packet, a capture command, expressed in $XX_{16}$ in hex notation, is stored as an opcode (operation code). Next, the subfunction information is stored as the operand [0], the source subunit type information (source_subunit_type) and the source subunit ID information (source_subunit_ID) are stored as the operand [1] in upper three bits and in lower three bits, respectively, the source plug information (source_plug) is stored as the operand [2], the status information is stored as the operand [3], and the destination plug information (dest_plug) is stored as the operand [4]. In a capture command, the job ID information (print_job_ID) is stored as operands [5] to [16], data size information [data_size] is stored as the operands [17] to [20], the image size information [image_size_x] is stored as the operands [21] to [22], the image size information [image_size_y] is stored as the operands [23] to [24], the image format information (image_format_specifier) is stored as the operands [25] to [26], the operands [27] to [29] are reserved, the picture number information (next_pic) specifying the picture umber for printing is stored as the operand [30] and the page number information (next_page) specifying the page number for printing is stored as the operands [31] to [32]. In this picture printing system 1, the job means processing contents throughout the data transmission processing and printing processing and is comprised of at least one page. The page is comprehended in the job and indicates a processing unit performed on a sole printing medium, such as a printing sheet, performed on the job. The page is comprised of at least one page. The picture indicates a processing unit comprehended in a page and which is obtained on splitting each page. Specifically, the page denotes a processing unit performed on one picture pattern comprehended in a printing medium.

Referring to FIG. 9, the subfunction information (subfunction) may be enumerated by the information expressed by 01 in hex notation and termed "reserve", the information expressed by 02 in hex notation and termed "restore", information expressed by 03 in hex notation and termed "abort", the information expressed by 04 in hex notation and termed "get_status".

The data conversion unit 13 sets the subfunction to [01 (receive)], [02 (restore)], [03 (abort)] and to [04 (get_status)] when demanding the printing device 5 to receive printing data, when causing the printing device 5 to re-start transmission of printing data, when notifying the printing device 5 to discontinue the transmission of printing data and when inquiring the printing device 5 as to the state of acquisition of the printing data, respectively. If the subfunction is other than 01, 02, 03 or 04 in hex notation (other values), the subfunction is Reserved.

The source subunit type information [source_subunit_type] is the information specifying the type of the subunit to which the STB 3 transmits the asynchronous packet 100, the source subunit ID information [source_subunit_ID] is an ID of the subunit transmitting the asynchronous packet 100, the source plug information (source_plug) is the plug number of the subunit to which the asynchronous packet 100 is transmitted, the reception side plug information (dest_plug) is a plug number of the subunit receiving the asynchronous packet 100, the job ID information (print_job_ID) is an ID of the processing (job) of printing a sole still picture, the data size information (data_size) is the amount of data transmitted from the STB 3 to the printing device 5 when printing a still picture on the printing device 5, the image size information (image_size_x) is the number of pixels in the x-direction, corresponding to the image type shown in FIG. 7, the image size information (image_size_y) is the number of pixels in the y-direction, corresponding to the image type, and the image format information (image_format_specifier) is the appellation of the image type. The Reserved is constituted by an optional number of bits and is provided to render the number of bits of the entire capture command equal to a multiple of 4. By providing this Reserved, the resulting number of bits is convenient for the data unit in transmitting the packet conforming to the IEEE 1394 standard.

In the image_format_specifier, the image type appellation is classified by the values of the hexadecimal number (Value) as shown in FIG. 10, where "chunky" in the image type appellation denotes that the image is the still picture transmitted point-sequentially from the data conversion unit 13 to the printing device 5, whereas "liner" denotes that the image is the still picture transmitted line-sequentially from the data conversion unit 13 to the printing device 5.

In the image_format_specifier, there may be stored not only the appellation of the image type, as shown in FIG. 10, but also the appellation of the image type expressed in hex notation (values, sub-values) and which is devoid of the information pertinent to the number of pixels, as shown in FIG. 11, in distinction from the image type shown in FIG. 10. The number of pixels for printing on the printing device 5 is defined by the image_size_x stated in the operands [21] to [22] and image_size_y stated in operands [23] to [24] in the capture command shown in FIG. 8.

For example, if [00] in hex notation is stated in the msb of the image_format_specifier (meaning: sRGB raw), it indicates that RGB data as picture data is to be transmitted to the printing device 5. If [00] in hex notation is stated in the msb of the image_format_specifier, then RGB data is transmitted in the sequence of R, G, B, R, G, B, . . . or in the sequence of R, G, B, 0, R, G, B, 0, . . . if [00] (Type: sRGB raw) in hex notation is stated in its lsb or if [01] (Type: sRGB raw, quadlet) in hex notation is stated in its lsb, respectively. That is, if [00] is stated in the msb, 0 data is transmitted between B and R so that R, G, B, 0 is transmitted as a one-unit 4-byte data.

If [01] (meaning: YCC raw) is stated in the msb of the image_format_specifier, it indicates that the picture data is to be transmitted as YCC data to the printing device 5. If [01] in hex notation is stated in the msb of the image_format_specifier, the luminance information and the chroma information are transmitted point-sequentially (chunky) as data of the 4:2:2 pixel format, data of the 4:2:2 pixel format is transmitted line-sequentially (liner), the luminance information and the chroma information are transmitted point-sequentially (chunky) as data of the 4:2:0 pixel format, and data of the 4:2:2 pixel format is transmitted line-sequentially (liner), if [0X] in hex notation, where X is an indefinite number (Type: YCC 4:2:2 raw/pixel), is stated in the lsb, if [1X] is stated in lsb (Type: YCC4:2:2 raw/line), if [8X] is stated in lsb (Type: YCC4:2:2 raw/chunky), or if [9X] is stated in lsb (Type: YCC4:2: raw/line), respectively.

If [01] in hex notation (meaning: YCC raw) is stated in the msb of the image_format_specifier and if [X0~XC] in hex notation is stated in the lsb, such data is transmitted in which the pixel ratio is specified (pixel ratio 1.00×1.00, pixel ratio 1.19×1.00 or pixel ratio 0.89×1.00), the color space is specified (ITU-R (International Telecommunications Union-Radio communication Sector) BT.709-2, ITU-R BT.601-4 or ITU-R BT.1203), point-sequential (chunky) or line-sequential (liner) transmission is specified. If [X0~X4] in hex notation is stated in the lsb, the interlaced picture is transmitted, whereas, if [X8~XC] in hex notation is stated in the lsb, the progressive picture is transmitted. If [X0~X2] and [X8~XA] are stated in the lsb, it indicates that data conforming to the ITU-RBT. 601 to 604 is transmitted. If [X4] and [XC] are stated in the lsb, it indicates that data conforming to the ITU-R BT. 1203 (PAL system) is transmitted.

If [10] in hex notation (meaning: DCF object) is stated in the msb of the image_format_specifier, it indicates that picture data is to be transmitted to the printing device 5 in a format prescribed in the digital camera (DCF: design rule for camera format). If [10] in hex notation is stated in the msb of the image_format_specifier, and [00] (Type: Exif2.1) in hex notation is stated in the lsb, it indicates that data to be transmitted is the Exif type data, in which the picture portion is of the JPEG system and a header recording the photographing states or conditions is appended. If the lsb is [01] (Type: JFIF (JPEG file interplay format)) in hex, it indicates that the data of the JFIF type is to be transmitted. If the lsb is [02] (Type: TIFF (tag image file format)) in hex, it indicates that the data of the TIFF type is to be transmitted whereas, if the lsb is [0F] (Type: JPEG point photographic coding experts group)), it indicates that picture data is to be transmitted to the printing device 5 in the JPEG format.

If [80 to 8F] in hex is stated in the msb of the image_format_specifier, it indicates that the data is to be transmitted in accordance with a different format, and data of the format specified by the [00 to FF] stated in the lsb is transmitted.

In the image_format_specifier, it is also possible to set [FE] in hex (meaning: special meaning) in the msb, to set [00] (type: unit plug defined) dependent on the STB3 and the plug of the printing device 5 in the lsb and to set [01] (don't care) not specifying the data format, in distinction from the above-given example.

The transmission rules for static image data are as shown in FIGS. 12 to 15.

FIG. 12 shows the transmission order of pixel data in point-sequential (chunky) transmission of static image data with a pixel format of YCC 4:2:2 to the printer device 5.

FIG. 13 shows the transmission order of pixel data in point-sequential (chunky) transmission of static image data with a pixel format of YCC 4:2:0 to the printer device 4.

FIG. 14 shows the transmission order of pixel data in line-sequential (liner) transmission of static image data with a pixel format of YCC 4:2:2 to the printer device 5.

FIG. 15 shows the transmission order of pixel data in line-sequential (liner) transmission of static image data with a pixel format of YCC 4:2:0 to the printer device 5.

In FIGS. 12 to 15, Yi(Lj) indicates luminance information Y having a pixel number i included in a line number j. The pixel number i used for designating the pixel of the luminance information Y has an integer value of 1 to N, and the line number j has an integer value of 1 to M. Cbi(Lj) indicates color-difference information Cb having a pixel number i included in a line number j. The pixel number i used for designating the pixel of the color-difference information Cb has a value of 1, 3, 5, . . . , N−1, and the line number j has an integer value of 1 to M in the case of YCC 4:2:2 or a value of 1, 3, 5, . . . , N−1 in the case of YCC 4:2:0. Cri(Lj) indicates color-difference information Cr having a pixel number i included in a line number j. The pixel number i used for designating the pixel of the color-difference information Cr has a value of 1, 3, 5, . . . , N−1, and the line number j has an integer value of 1 to M in the case of YCC 4:2:2 or a value of 1, 3, 5, . . . , N−1 in the case of YCC 4:2:0. N indicates the total number of pixels in one line. M indicates the total number of lines within one screen.

In this case, when point-sequentially (chunky) transmitting to the printer device 5 the static image data included in the asynchronous packet 100 having an image type of 480_422_4×3 shown in FIG. 10 and constituted by pixels with the pixels numbers 1 to 720 provided in the x-direction and the line numbers 1 to 480 provided in the y-direction, the data conversion section 13 transmits the pixel data as shown in FIG. 16.

Specifically, subsequent to the address offset (address_offset), the data conversion section 13 transmits the luminance information Y1(L1), luminance Y2(L1), color-difference information Cb1(L1) and color-difference information Cr1(L1) with a respect to the pixel number 1 included in the line number 1. Then, subsequent to the pixel data up to the pixel number 720 included in the line number 1, the data conversion section 13 transmits the luminance information and color-difference information of the next line number 2 and subsequent line numbers. The data conversion section 13 transmits the pixel data up to the pixel number 720 included in the line number 480, thereby completing transmission of the static image data representing one static image.

When the image type is 480_420_4×3, the data conversion section 13 transmits the luminance information Y1(L1), luminance information Y2(L1), luminance information Y1(L2) and luminance information Y2(L2) with respect to the pixel number 1 included in the line number 1 subsequent to the address offset (address_offset), and then transmits the color-difference information Cb1(L1), color-difference information Cr1(L1), luminance information Y3(L1) and luminance information Y4(L1) included in the pixel data of the pixel number 1, as shown in FIG. 17. Then, the data conversion section 13 transmits the pixel data up to the pixel number 720 included in the line number 480, thereby completing transmission of the static image data representing one static image.

When line-sequentially transmitting the static image data having the image type of 480_422_4×3 included in the asynchronous packet 100, the data conversion section 13 transmits the luminance information Y1(L1), luminance information Y2(L1), luminance information Y3(L1), luminance information Y4(L1), . . . , luminance information Y720(L1) with respect to the line number 1 subsequent to the address offset (address_offset), and then transmits the color-difference information Cb1(L1), color-difference information Cr1(L1), . . . , color-difference information Cb720(L1) and color-difference information Cr720(L1) with respect to the line number 1, as shown in FIG. 18. Then, the data conversion section 13 transmits the luminance information and color-difference information of the line number 2 and subsequent line numbers, and transmits the color-difference information Cr720(L480) of the line number 480, thereby completing transmission of the static image data.

When line-sequentially transmitting the static image data having the image type of 480_420_4×3 included in the asynchronous packet 100, the data conversion section 13 first transmits the luminance information Y1(L1) to luminance information Y720(L1) of the line number 1, the transmits the luminance information Y1(L2) to luminance information Y720(L2) of the line number 2, and then transmits the color-difference information Cb1(L1), color-difference information Cr1(L1) to color-difference information Cb720(L1), color-difference information Cr719(L1) of the line number 1, thus transmitting the pixel data of the line number 1 and the line number 2, as shown in FIG. 19. Then, the data conversion section 13 transmits the luminance information and color-difference information of the line number 3 and subsequent line numbers, and transmits the color-difference information Cb719(L479) and color-difference information Cr719(L479), thereby completing transmission of the static image data.

Figure 20:
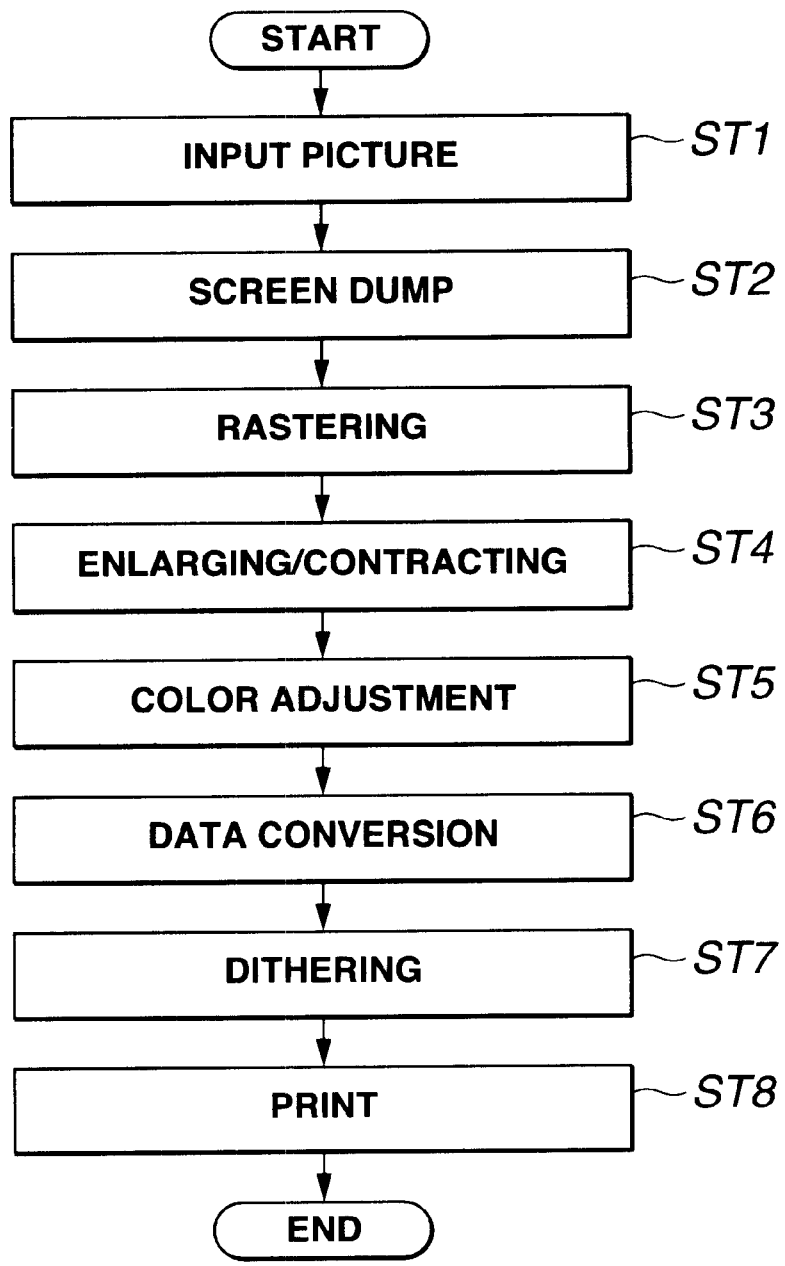
FIG. 20 is a flowchart for illustrating the processing sequence for printing by a printing device of the picture printing system embodying the present invention.

The processing contents conforming to the printing control program on the printing device 5 is explained by referring to the flowchart of FIG. 20.

In FIG. 20, the data input unit 31 of the printing device 5 at step ST1 is fed from the data conversion unit 13 with a packet generated in accordance with the IEEE 1394 standard. The data input unit 31 performs the processing in the transaction layer, link layer and in the physical layer, in accordance with the IEEE 1394 standard, to extract the still picture data which is the YCC picture made up of the luminance information Y and the chroma information Cr and Cb.

At the next step ST2, the CPU 35 performs screen dumping for printing all of what is displayed on the entire screen of the television device 4.

At the next step ST3, the CPU 35 performs mastering on the still picture data screen-dumped at step ST2. That is, the CPU 35 performs the processing of converting the still picture data into dot form for transferring the data to the print engine 33.

At the next step ST4, the CPU 35 performs enlargement/contraction processing on the still picture data rastered at the above step ST3. That is, the CPU 35 performs the processing of changing the printing size of the still picture within a range specified by the user.

At the next step ST5, the CPU 35 adjusts the color of the still picture data enlarged/contracted at the above step ST4 to prepare printing data of R (red), G (green) and B (blue).

The relational expression of a pixel value with the color space designated in the Y (ITU-R BT.601-4) format and a pixel value with the color space designated by RGB is described as follows.

$$Y'_{601YCC} = 0.299 * R'_{RGB} + 0.587 * G'_{RGB} + 0.144 * B'_{RGB}$$

$$Cr'_{601YCC} = 0.713 * (R'_{RGB} - Y'_{601YCC})$$
$$= 0.500 * R'_{RGB} - 0.419 * G'_{RGB} - 0.081 * B'_{RGB}$$

$$Cb'_{601YCC} = 0.564 * (B'_{RGB} - Y'_{601YCC})$$
$$= -0.169 * R'_{RGB} - 0.331 * G'_{RGB} + 0.500 * B'_{RGB}$$

As an 8-bit value, these can be expressed as follows.

$$Y'_{601YCC\_8bit} = (219.0 * Y'_{601YCC}) + 16.0$$

$$Cb'_{601YCC\_8bit} = (224.0 * Cb'_{601YCC}) + 128.0$$

$$Cr'_{601YCC\_8bit} = (224.0 * Cr'_{601YCC}) + 128.0$$

This 8-bit value is transmitted as image data from the STB 3 to the printer device 5, and the 8-bit YCC value is converted to RGB at step ST5.

The relational expression of a pixel value with the color space designated in the Y (ITU-R BT.709-2) format and a pixel value with the color space designated by RGB is described as follows.

$$Y'_{709YCC} = 0.2126 * R'_{RGB} + 0.7152 * G'_{RGB} + 0.0722 * B'_{RGB}$$

$$Cb'_{709YCC} = 0.5389 * (B'_{RGB} - Y'_{709YCC})$$

$$Cr'_{709YCC} = 0.6350 * (R'_{RGB} - Y'_{709YCC})$$

As an 8-bit value, these can be expressed as follows.

$$Y'_{709YCC\_8bit} = (219.0 * Y'_{709YCC}) + 16.0$$

$$Cb'_{709YCC\_8bit} = (224.0 * Cb'_{709YCC}) + 128.0$$

$$Cr'_{709YCC\_8bit} = (224.0 * Cr'_{709YCC}) + 128.0$$

This 8-bit value is transmitted as image data from the STB 3 to the printer device 5, and the 8-bit YCC value is converted to RGB at step ST5.

At the next step ST6, the CPU 35 converts the color-adjusted picture data of R, G and B into respective colors of cyan, magenta and yellow to decide the proportions of the cyan, magenta and yellow in each dot. The CPU 35 then performs dithering at step ST7.

Next, at step ST8, the CPU 35 outputs the dithered printing data to the print engine 33 to drive the print engine 33 to perform printing processing of drawing a picture on the support.

Figure 21:
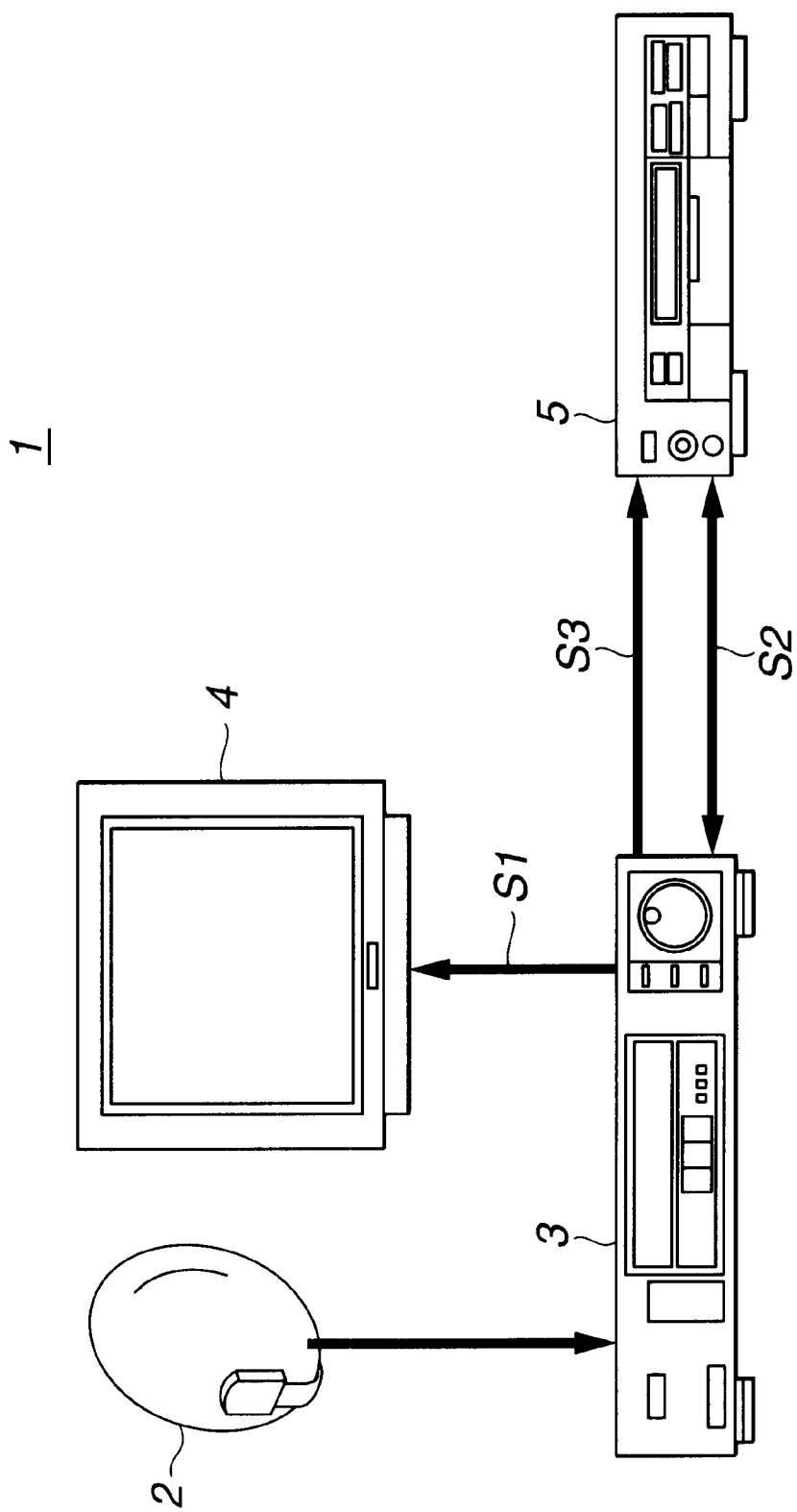
FIG. 21 illustrates the processing sequence for printing by a printing device of the picture printing system embodying the present invention.

In the picture printing system 1, configured as discussed above, the processing of the CPU 23 in printing picture data received at the STB 3 by the printing device 5 is explained with reference to FIGS. 21 and 22.

Figure 22:
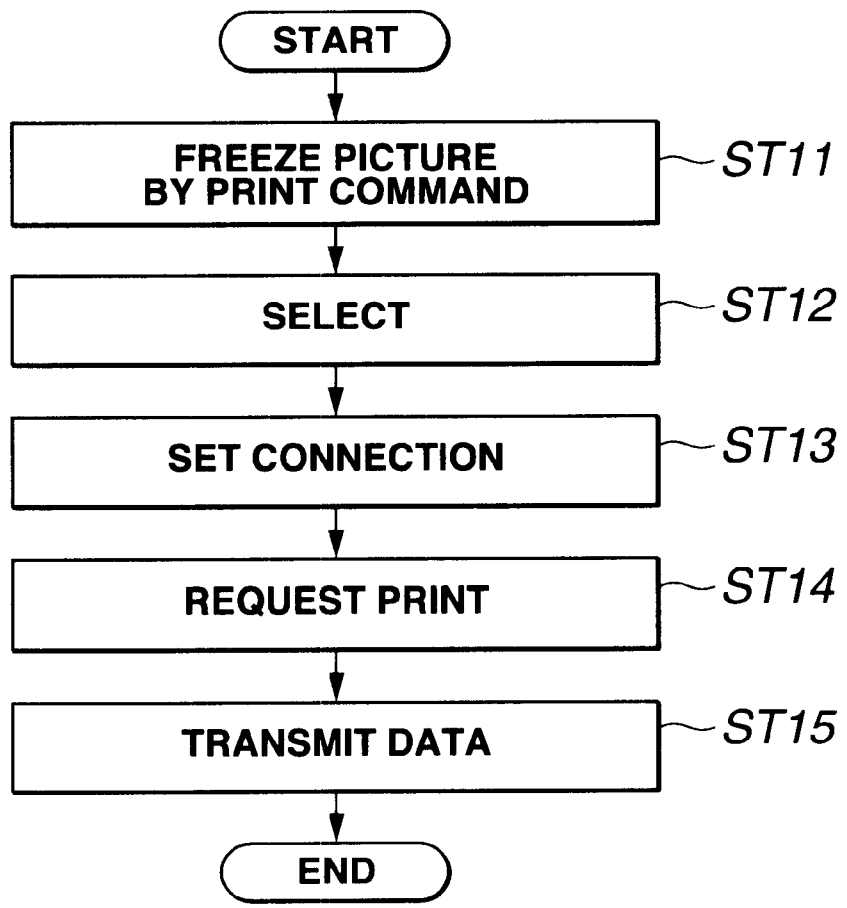
FIG. 22 is a flowchart for illustrating the processing sequence of an STB in printing a picture displayed on a television device by a printer device.

In the flowchart shown in FIG. 22, the CPU 23 of the STB 3 is fed at step ST11 with an operating input signal of freezing the moving picture displayed on the television device 4, by the user acting on the operating button provided on the STB 3. The CPU 23 is responsive thereto to control the display controller 19 to halt the outputting (S1 in FIG. 21) of the moving picture data from the NTSC encoder 18 to the television device 4 to demonstrate the still picture on the television device 4.

If, at the next step ST12, the operating input signal of selecting the frame-based still picture data, frozen at the above step ST11 and demonstrated on the television device 4, to print the picture data on the printing device 5, is fed to the CPU 35 from the operating input unit 21, the CPU 25 controls the display controller 19, MPEG processor 16 and the demultiplexer 14 to read-in the frame-based still picture data a stored in the display memory 20 in the picture memory 15. This permits the CPU 35 to store the still picture data, made up of the luminance information Y and the chroma information Cr, Cb, in the picture memory 15.

At the next step ST13, the CPU 35 controls the data conversion unit 13 to establish the interconnection between the STB 3 and the printing device 5 in accordance with the IEEE 1394 standard. That is, when fed with the control signal for establishing the interconnection from the CPU 35, the data conversion unit 13 generates a command packet to effect plug recognition between it and the data input unit 31. At this time, the data input unit 31 of the printing device 5 sends a command packet (S2), having stored therein the information indicating the source plug, to the data conversion unit 13. The data input unit 31 of the printing device 5 transmits to the data conversion unit 13 a command packet (S2), having stored therein the information indicating the destination plug for making asynchronous connection on recognition of the information indicating the source plug, to the data conversion unit 13. This allows the data conversion unit 13 to recognize the information indicating the destination plug of the data input unit 31 of the printing device 5, while allowing the data input unit 31 to recognize the information indicating the source plug of the data conversion unit 13 of the STB 3.

At the next step ST14, the CPU 23 demands the printing device 5 of the printing size, direction and position as well as the number of printing sheets in printing the still picture.

At the next step ST15, the CPU 23 controls the demultiplexer 14 and the data conversion unit 13 to output the still picture data to the printing device 5 for printing thereby to generate a data packet (S2) comprehending the still picture data stored in the picture memory 15 to transmit the data packet to the printing device 5.

If the printing device 5 has received plural data packets, inclusive of the information indicating the destination plug, and so has verified that the entire still picture data has been received, the printing device 5 performs the processing shown in FIG. 20, under control by the CPU 35, to print the picture indicated by the still picture data in accordance with the specified printing size and so forth.

An instance of transmitting/receiving the asynchronous packet 100 between the STB 3 and the printing device 5 to cause the printing device 5 to print the printing data (still picture data) is now explained with reference to FIG. 23.

Figure 23:
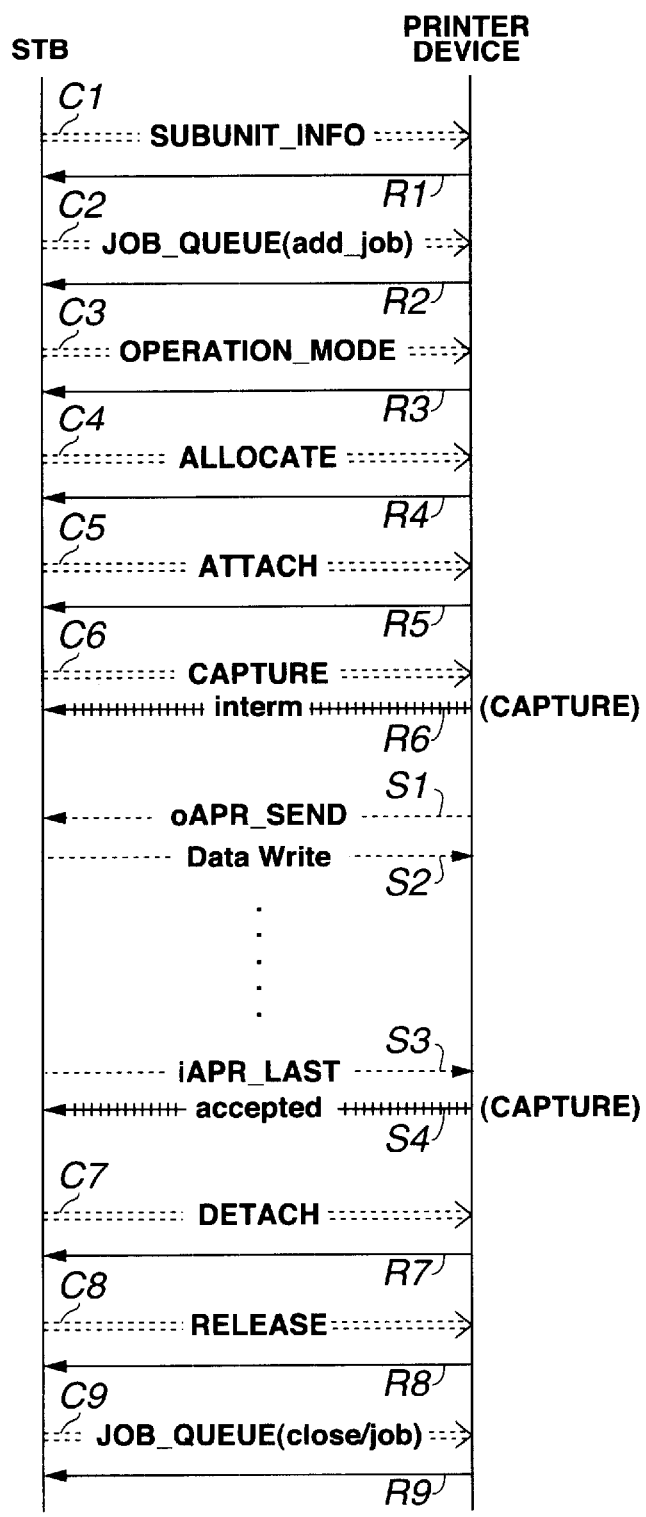
FIG. 23 is a flowchart for illustrating the processing performed by the transmitting/receiving an asynchronous packet between a data outputting unit and a data inputting unit to transmit still picture data from the data outputting unit to the data inputting unit.

Referring to FIG. 23, the data conversion unit 13 of the STB 3 transmits to the data input unit 31 the command packet C1, inclusive of a command (SUBUNIT_INFO) for inquiring into the information on e.g., the state of the subunit (data input unit 31) on the printing device 5, to receive a response packet R1 thereto.

Before starting the data transmission processing, the data conversion unit 13 indicates to the printing device 5 that there is a job of transmitting a command packet (JOB_QUEUE) C2 to print a still picture. The data conversion unit 13 receives a corresponding response packet R2.

The data conversion unit 13 transmits to the printing device 5 a command packet C3, specifying an operation mode indicating the settings for printing processing, such as sort or size of the printing sheets, printing quality, printing color (monochromatic/color) or printing positions, in effecting the printing by the printing device 5. The data conversion unit 13 receives a corresponding response packet R2.

The data conversion unit 13 sets a plug for transmitting printing data to the data input unit 31. That is, the STB 3 transmits to the data input unit 31 a command packet C4, having stored therein the ALLOCATE command packet C5, and receives a corresponding response packet R5.

The data conversion unit 13 transmits a command packet C5, having stored therein an ATTACH command for transmitting/receiving a data packet by setting a plug for receiving a data packet comprehending printing data for printing in the printing device 5, and acquired a corresponding response packet R5.

The data conversion unit 13 transmits a command packet C6, inclusive of a capture command requesting the data input unit 31 to receive the printing data by storing RECEIVE in the subfunction. It is noted that the information indicating the source plug on the data conversion unit 13 (source_plug) is stored in the command packet C6. The data input unit 31 is responsive thereto to transmit to the data conversion unit 13 a response packet R6 having stored therein the INTERIM indicating that the result cannot be returned immediately.

The data input unit 31 then transmits to the data conversion unit 13 a packet S1 inclusive of the information of setting oAPR (output Asynchronous Port register) indicating a port by which to transmit printing data asynchronously from the data conversion unit 13. In the packet S1 is stored the information (dest_plug) indicating the destination plug of the data input unit 31. The data conversion unit 13 recognizes the destination plug of the data input unit 31.

The data conversion unit 13 then returns a data packet S2, having stored therein printing data, to the data input unit 31. The data conversion unit 13 divides the prinking data into pre-set data sizes to transmit plural data packets S2.

When the transmission of the entire still picture data comes to a close, the data conversion unit 13 transmits to the data input unit 31 the command packet S3 comprehending the information pertinent to the iAPR (input Asynchronous Port Register) of a flow control register of the source plug.

The data input unit 31 then transmits to the data conversion unit 13 a response packet S3, indicating acceptance of a command packet C6 comprehending a capture command.

The data conversion unit 13 is responsive thereto to transmit a command packet C7 comprehending a DETACH command specifying the disconnection from the printing device 5 to receive a response packet R7 from the data input unit 31.

The data conversion unit 13 transmits a command packet C8, comprehending a RELEASE command, to the data input unit 31, to receive a response packet R8 therefrom.

The data conversion unit 13 then transmits to the data input unit 31 a command packet C9 (JOB_QUEUE) indicating the end of the sequence specifying a job of printing a still picture to receive a corresponding reference picture R9.

Figure 24:
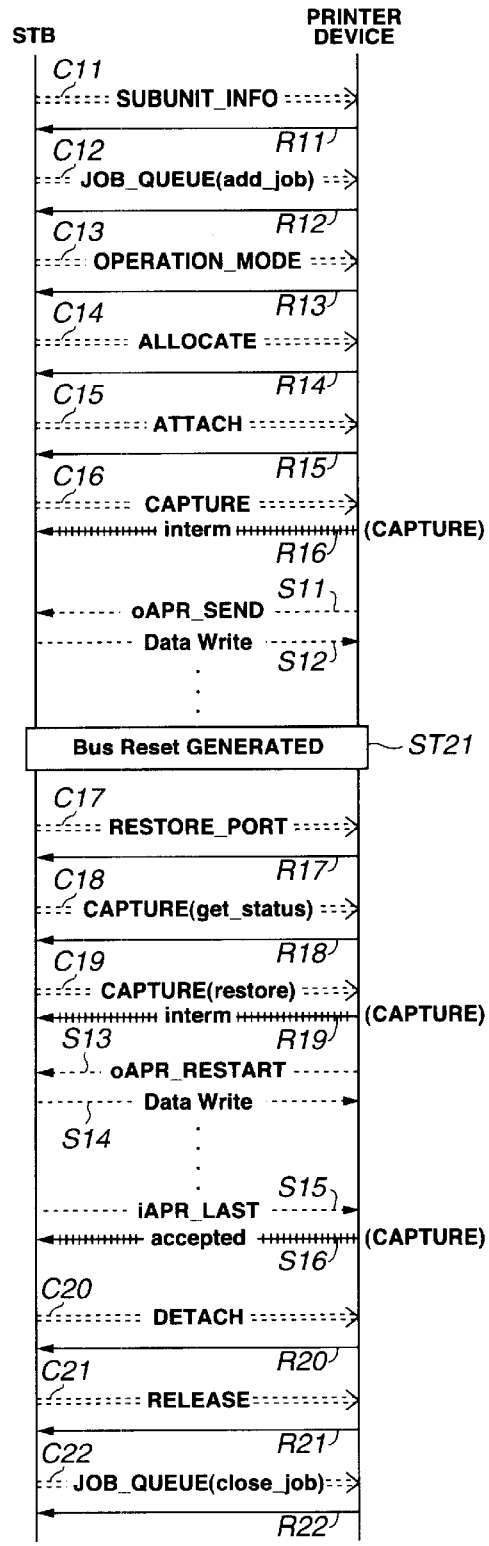
FIG. 24 is a flowchart for illustrating the processing performed by the data outputting unit and the data inputting unit when bus resetting has occurred during data transmission from the data outputting unit to the data inputting unit.

Referring to FIGS. 24 and 25, the processing by the STB 3 and the printing device 5 in case bus resetting has occurred during transmission of printing data when an asynchronous packet 100 is transmitted/received between the STB 3 and the printing device 5 to print the printing data on the printing device 5, is explained.

Referring to FIG. 24, the data conversion unit 13 sends to the data input unit 31 a command packet C1 inquiring into the information as to the status of the subunit (data input unit 31) provided on the printing device 5, and receives a corresponding response packet R11.

Before starting the printing processing, the data conversion unit 13 sends a command packet (JOB_QUEUE) to the printing device 5 to indicate that a still picture need to be printed, and receives a corresponding response packet R11.

The data conversion unit 13 transmits to the printing device 5 a command packet C13 specifying an operation mode specifying the settings for printing processing, such as the sort or size of the printing sheets, printing quality, printing color (monochromatic/color) or printing positions, in effecting the printing by the printing device 5. The data conversion unit 13 receives a corresponding response packet R13.

The data conversion unit 13 sets a plug for transmitting printing data to the data input unit 31. That is, the STB 3 transmits to the data input unit 31 a command packet C14, having stored therein the ALLOCATE command, and receives a corresponding response packet R14.

The data conversion unit 13 transmits a command packet C15, inclusive of an ATTACH command indicating setting as plug for receiving a data packet comprehending printing data for printing by the printing device 5 to effect transmission/reception of data packets, and receives a corresponding response packet R14.

The data conversion unit 13 sets the subfunction to RECEIVE to transmit a command packet C16 comprehending the capture command requesting reception of printing data. The data input unit 31 is responsive thereto to transmit to the data conversion unit 13 a response packet R16 having stored therein the INTERIM indicating that the result cannot be returned immediately.

The data input unit 31 then transmits to the data conversion unit 13 a packet S1 inclusive o the information of setting oAPR (output Asynchronous Port register) indicating a port by which to transmit printing data asynchronously from the data conversion unit 13.

The data conversion unit 13 then sends to the data input unit 31 a data packet S12 having printing data stored in the data part 102.

Assume that bus resetting has occurred at step ST21 during the time the data packet S12 is being transmitted from the STB 3 to the printing device 5. This destructs the command packet C16 in the data input unit 31 of the printing device 5.

If bus resetting occurs at step ST21, a command packet C17, comprehending a command (RESTORE_PORT) for regenerating the asynchronous connection established using the above-mentioned ALLOCATE command and ATTACH command to set a port is transmitted to the data input unit 31, and a corresponding response packet R17 is received. This permits the data conversion unit 13 and the data input unit 31 to establish the same asynchronous connection as that set prior to occurrence of the bus resetting to restore the interconnection.

The data conversion unit 13 then transmits a command packet C18, comprehending a capture command having the subfunction set to Get_status, as shown in FIG. 25, to the data input unit 31. That is, the data conversion unit 13 queries the data input unit 31 as to the reception state immediately before the occurrence of the bus resetting at step ST21. At this time, the data conversion unit 13 inquires into e.g., the information pertinent to the data position derived from the data transmission size in the asynchronous connection, the information pertinent to the pages of the printing data received by the data input unit 31 and into the printing picture information indicating the picture in the page. Specifically, the data conversion unit 13 queries the data input unit 31 as to the next_page and next_pic, comprehended in the packet received by the data input unit 31 immediately before the occurrence of the bus resetting at step ST21, and also as to the STATUS indicating the status of the data input unit 31 subsequent to the bus resetting.

The data input unit 31 is responsive to reception of the command packet C18 to change the next_offset indicating the data position received next based on the data size received before the occurrence of the bus resetting at step ST21, the next_page indicating the page number of the printing data received next and the next_pic indicating the picture number of the printing data received next, to transmit the resulting response packet R18 to the data conversion unit 13.

The data conversion unit 13, on reception of the response packet R18, refers to the next_offset comprehended in the response packet R18, to recognize the data position of the printing data initially transmitted after re-initiation of the data transmitting operation, to recognize the page number and the picture number referenced next. It is noted that the data conversion unit 13 recognizes printing data, corresponding to the page number and the picture number obtained on subtracting "1" from the page number and the picture number described in the next_page and the next_pic comprehended in the response packet R18, as being printing data to be transmitted next.

In the command packet C18 transmitted from the data conversion unit 13 to the data input unit 31 and in the response packet R18 transmitted from the data input unit 31 to the data conversion unit 13, the data shown in Table 1:

TABLE 1

|  | capture command (get_status) | response |
|---|---|---|
| CTS~operand [0] | 00104204 | 09104204 |
| operands [1]–[4] | FFA0FF00 | FFA00000 |
| operands [5]–[8] | UUUUUUUU | UUUUUUUU |
| operands [9]–[12] | UUUUUUUU | UUUUUUUU |
| operands [13]–[16] | 00000000 | 00000000 |
| operands [17]–[20] | FFFFFFFF | SSSSSSSS |
| operands [21]–[24] | FFFFFFFF | FFFFFFFF |
| operands [25]–[28] | FFFFOOOO | FFFFOOOO |
| operands [29]–[32] | 00FFFFFF | 00NNPPPP |

The above Table 1 represents the information stored in the respective regions in hex notation. It is noted that the uppermost "0" of the command packet C18 is the CTS specifying the FCP data, the next "0" is the ctype, the next "10" is the subunit_type and subfunction_ID, the next "42" is an opcode indicating a capture command and the next "04" is a subfunction (operand [0]) indicating get_status.

In comparison to the command packet C18, the uppermost "0" of the response packet R18 is the CTS similar to the above-mentioned command packet C18, the next "9" is the response type indicating the acceptance of the command, the next "10" indicates the subunit_type and the subfunction_ID, the next "42" is the opcode specifying the capture command and the next "04" is the subfunction (operand [0]) specifying the get_status.

With the status of the operand [3] of the capture command C18 being "FF", the data input unit 31 sets the status of the operand [3] of the response packet R18 to [00], as shown in FIG. 26, to notify the status of the printing device 5 subsequent to the occurrence of the bus resetting to the data conversion unit 13.

With the next_offset in the data_size of the operands [17] to [20] of the capture command C18 being "FFFFFFFF", the data input unit 31 sets the operands [17] to [20] of the response packet R18 to "SSSSSSSS" to advise the data conversion unit 13 of the data size received by the command packet C18 as the next_offset.

With the next_pic stated as "FF" in the operands [30] to [32] of the capture command C18 being stated as [FF] and with the next_page stated as being "FFFF", the data input unit 31 sets the operand [30] of the response packet R18 to "NN" to notify the next_pic (picture) comprehended in the packet received directly before the occurrence of the bus resetting, while setting the operands [31] to [32] to "PPPP" to notify the next_page (page) comprehended in the packet received directly before the occurrence of the bus resetting.

The data conversion unit 13 is responsive to reception of the response packet R18 from the data input unit 31 to transmit to the data input unit 31 a command packet C19 comprehending a capture command in which the subfunction is set to restore (02), as shown in FIG. 27. It is noted that the data conversion unit 13 restores only the subfunction in order to advise the data input unit 31 of the fact that the command is the same as the above-mentioned command packet pertinent to the capture. That is, the data conversion unit 13 analyzes the response packet R18 to recognize from which printing data (page, picture) to transmit on re-initiation of the data transmission processing to notify to the data input unit 31 that the processing of transmitting the printing data from a packet next to the packet the data input unit 31 received immediately before the occurrence of the bus resetting at step ST21 is to be re-initiated. The data input unit 31 transmits to the data conversion unit 13 a response packet obtained on storing the INTERIM in the subfunction in the command packet C19 shown in FIG. 28.

In the command packet C19 and the response packet R19 are stored data indicated in the following Table 2:

TABLE 2

|  | capture command (restore) | response (interim) | response (accepted) |
|---|---|---|---|
| CTS~operand [0] | 00104202 | 0F104202 | 09104202 |
| operands [1]~[4] | AAA0FF00 | FFA0FF00 | FFA00000 |
| operands [5]~[8] | UUUUUUUU | UUUUUUUU | UUUUUUUU |
| operands [9]~[12] | UUUUUUUU | UUUUUUUU | UUUUUUUU |
| operands [13]~[16] | 00000000 | 00000000 | 00000000 |
| operands [17]~[20] | SSSSSSSS | SSSSSSSS | SSSSSSSS |
| operands [21]~[24] | XXXXYYYY | XXXXYYYY | XXXXYYYY |
| operands [25]~[28] | 11110000 | 11110000 | 11110000 |
| operands [29]~[32] | 00FFFFFF | 00FFFFFF | 00NNPPPP |

Referring to Table 2, the data conversion unit 13 states [02(restore)] in the subfunction of the command packet C19 to advise the data input unit 31 of the re-starting of the data transmission processing. The data conversion unit 13 states the same values as those of the next_offset obtained with the response packet R18 in the operands [17] to [20] to advise the data input unit 31 of the size of the printing data transmitted after re-starting the data transmission, while stating [XXXX (image_size_x)] in the operands [21] to [22] to advise the data input unit 31 of the size in the X-direction of the picture indicated by the printing data to be transmitted following the re-starting of the data transmission processing. The data conversion unit 13 also states [YYYY (image_size_y)] in the operands [23] to [24] to advise the data input unit 31 of the size in the Y-direction of the picture indicated by the printing data to be transmitted following the re-starting of the data transmission processing. The data conversion unit 13 also states [IIII (image_format_specifier)] in the operands [25] to [26] to advise the data input unit 31 of the data format of the printing data to be transmitted following the re-starting of the data transmission processing.

The data input unit 31 then transmits to the data conversion unit 13 a packet S13, the oAPR mode of which is set to RESTART, responsive to the re-starting of the data transmission processing with the command packet C19.

The data conversion unit 13 is responsive to the packet S13 to transmit to the data input unit 31 a data packet S14, having stored therein the printing data next to the data received by the data input unit 31 immediately before the occurrence of the bus resetting at step ST21 and the following data to the data input unit 31.

After the transmission of the entire printing data has been finished, the data conversion unit 13 transmits a command packet S15 comprehending iAPR_LAST, obtained on changing the mode of the iAPR (input Asynchronous Port Register) of the flow control register of the source plug to LAST, to the data input unit 31.

The data input unit 31 transmits to the data conversion unit 13 a response packet S16, indicating acceptance of the command packet C6 comprehending the capture command shown in FIG. 29. It is noted that the response packet S16 stores [9 (accepted)] in its response type, as shown in Table 2, and that, as in the case of the response packet R18, the next_pic of the operand [30] and the next_page of the operands [31] to [32] are updated to [PPPP].

The data conversion unit 13 is responsive thereto to transmit a command packet C20 comprehending a DETACH command indicating disconnection from the printing device 5 to acquire a response packet R20 from the data input unit 31.

The data conversion unit 13 then transmits a command packet C21 comprehending the RELEASE command to the data input unit 31 of the printing device 5 to acquire the response packet R21 from the data input unit 31.

The data conversion unit 13 then transmits a command packet (JOB_QUEUE) C22, indicating the end of a sequence specifying a job of printing a still picture, to the data input unit 31 to acquire a response packet R22 thereto.

Figure 30:
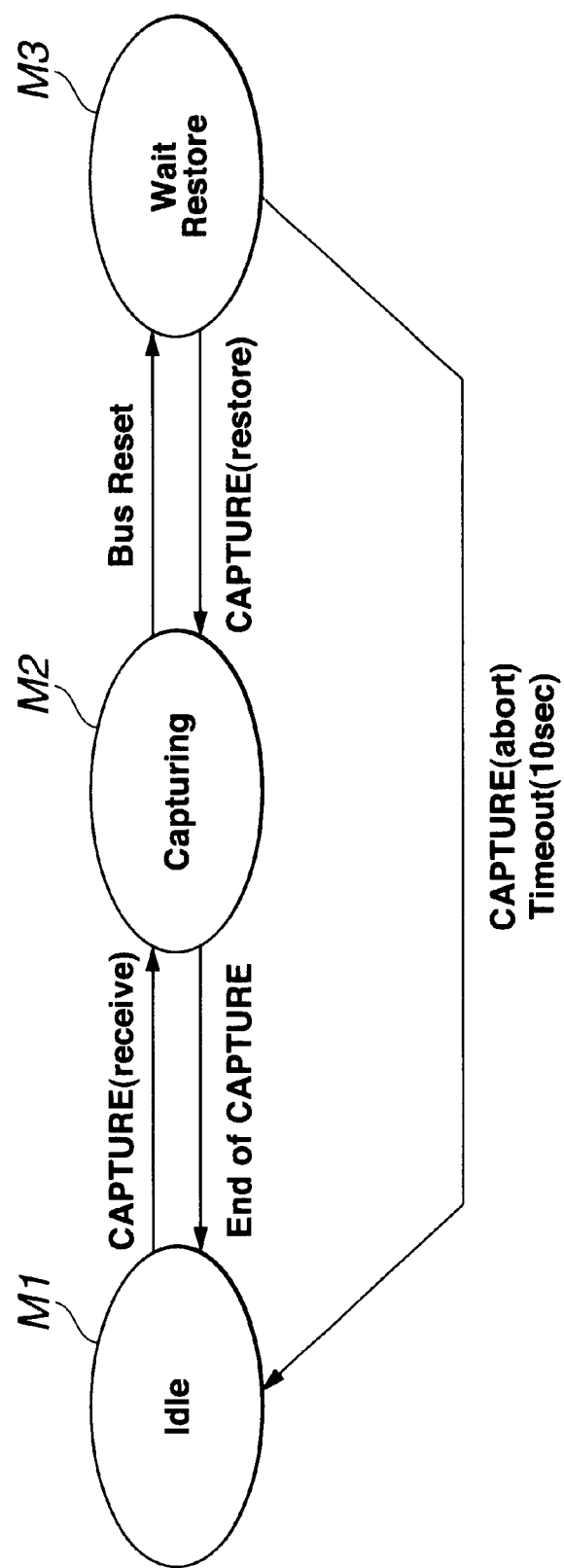
FIG. 30 is a status transition diagram of a picture printing system embodying the present invention.

If the picture printing system 1 is not in operation, as shown in FIG. 30, the STB 3 and the printing device 5 are in the idle mode M1. If, in this idle mode, a control signal for performing the printing by the printing device 5 is input by the CPU 23 in the STB 3 to the data conversion unit 13, the data conversion unit 13 outputs to the data input unit 31 a command packet comprehending the capture command, having the subfunction set to receive, with the mode then transferring to the capturing mode M2.

If, in the capturing mode M2, transmission of the entire printing data from the data conversion unit 13 to the data input unit 31 comes to a close, the mode is reset to the idle mode M1. If, in the capturing mode M2, bus resetting occurs, the mode transfers to the wait/restart mode M3.

If, in the wait/restart mode M3, a capture command, having the subfunction set to restore, is transmitted from the data conversion unit 13 to the data input unit 31, the mode is again reset to the capturing mode M2. In the capturing mode M2, reset from the wait/restart mode M3, data transmission processing is started as from the printing data next following the printing data transmitted from the data conversion unit 13 to the data input unit 31 immediately before occurrence of the bus resetting.

If, in the wait/restart mode M3, a capture command, having the subfunction aborted, is transmitted from the data conversion unit 13 to the data input unit 31, the data transmission processing is discontinued, with the mode being reset to the idle mode M1. If, in this wait/restart mode M3, a pre-set time, such as 10 seconds, has elapsed as from the occurrence of the bus resetting, the mode is reset to the idle mode M1.

In this picture printing system 1, if bus resetting occurs during transmission of printing data to be printed by the printing device 5 from the data conversion unit 13 to the data input unit 31, data transmission can be started as from the next printing data to the printing data received by the data input unit 31 immediately before occurrence of the bus resetting. So, in this picture printing system 1, if bus resetting occurs during data transmission, there is no necessity of re-transmitting the printing data from the outset or of transiently discontinuing the printing job to proceed to re-printing, so that the data transmission and printing can be continued. As a result, in this picture printing system 1, it is possible to shorten the data transmission time on occurrence of bus resetting, and hence the overall printing time inclusive of the data processing and printing time.

Figure 31:
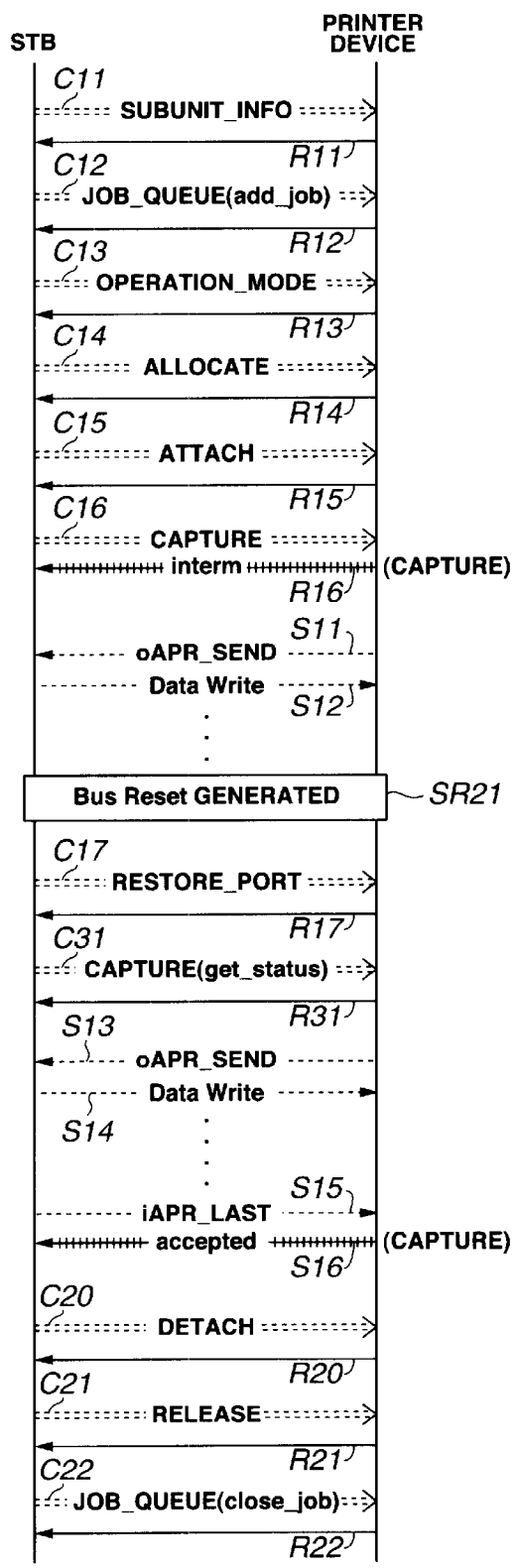
FIG. 31 is a flowchart for illustrating another processing performed by the data outputting unit and the data inputting unit on occurrence of bus resetting during data transmission from the data outputting unit to the data inputting unit.

Referring to FIG. 31, the other processing on the STB 3 and the printing device 5 on occurrence of bus resetting during transmission of printing data for printing the printing data by the printing device 5 as an asynchronous packet 100 is transmitted/received between the STB 3 and the printing device 5 is explained. In the following explanation, which is made with reference to FIG. 31, the same parts or components as those of the packet shown in FIG. 24 are indicated by the same reference numerals and are not explained specifically.

Referring to FIG. 31, the data conversion unit 13 transmits to the data input unit 31 the command packet C17, comprehending a command (RESTORE_PORT), and receives a corresponding response packet R17. This allows to set the same asynchronous connection as that set before bus resetting to restore the interconnection.

The data conversion unit 13 then transmits to the data input unit 31 a command packet C31 comprehending a capture command having the subfunction shown in FIG. 32(*a*) set to Get_status. The data conversion unit 13 then periodically polls the data input unit 31 as to the reception state prevailing immediately before occurrence of bus resetting at step ST21. That is, the data conversion unit 13 checks into the reception status information of the data input unit 31 stated in the operand [2].

The response packet R31 to the command packet C31 is as shown in FIG. 32(*b*). That is, if data transmission has been finished regularly, using the asynchronous connection restored by the command packet C17 and the response packet R17, [00] in hex is stated in the operand [2], indicating that the data transmission has been finished regularly. The page number [01] to be transmitted next is stated on the operand [30].

If some unusual situation occurs by some reason during the periodic polling, such that data transmission is finished unusually, [00] is stated in the operand [2] (receiving) such that a response packet stating [00] in the operand [30] is transmitted (FIG. 32(*c*)). At this time, the data conversion unit 13 re-transmits data, using a capture command, as from the time immediately before the occurrence of step ST21.

If data transmission by asynchronous connection has not been finished for some reason, a response packet stating [01] (receiving) in the operand [2] and a response packet stating [00] in the operand [30] are transmitted to the data conversion unit 13 (FIG. 32(*d*)). The data conversion unit 13 discontinues data transmission after a pre-set time (10 sec) as from the step ST21, and proceeds to re-starting data transmission to effect data transmission as from the time immediately before step ST21.

When proceeding to discontinue the data transmission, the data conversion unit 13 formulates a capture command stating [03 (abort)] in the subfunction to transmit the so-formulated capture command to the data input unit 31. The data conversion unit 13 then transmits a command packet comprehending a DETACH command and a command packet comprehending a RELEASE command, in this order, to annul the asynchronous connection between the STB 3 and the printing device 5.

When proceeding to re-start the data transmission, the data conversion unit 13 transmits a command packet comprehending the ALLOCATE command to the data input unit 31. The data conversion unit 13 then transmits a command packet comprehending the ATTACH command to the data input unit 31 to re-establish the asynchronous connection between the STB 3 and the printing device 5.

Figure 33:
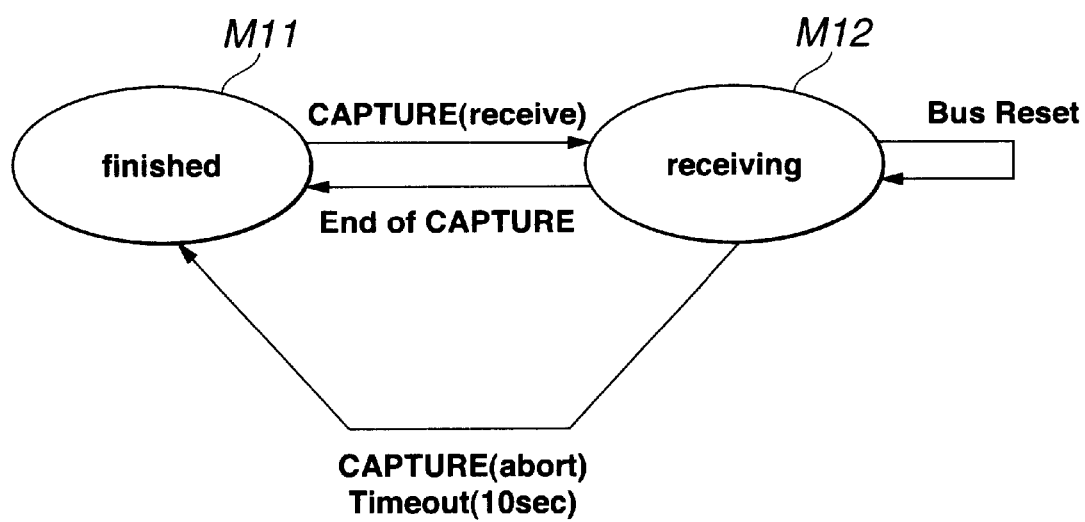
FIG. 33 is a status transition diagram of contents described in a status.

FIG. 33 shows the status transition of the contents stated in the STATUS comprehended in the operand [2]. Referring to FIG. 33, when the data transmission is finished as regularly, and a capture command stating [00 (finished)] and stating [01 (receive)] in the subfunction as shown in the mode M11 is transmitted from the data conversion unit 13 to the data input unit 31, a response packet stating [01 (receiving)] is transmitted from the data input unit 31 to the data conversion unit 13. If data transmission is finished in the mode 12, the mode transfers to the mode M11 and, if bus resetting occurs, the mode is re-set to mode M12. If data transmission is to be discontinued in the mode M12, the mode is re-set to the mode m11.

In the picture printing system 1, performing the processing shown in FIG. 31, a command packet C31 is periodically transmitted from the data conversion unit 13 to the data input unit 31 to check whether or not the data transmission has been finished. Thus, it is checked whether or not the data transmission has been finished regularly depending on the contents of description of the operand [2] comprehended in the response packet prepared in the data input unit 31. If the data transmission has not been completed normally, the processing of transmission may again be performed as from the data directly previous to the occurrence of bus resetting at step ST21. So, in this picture printing system 1, data transmission can be re-initiated more readily than in the processing described above in connection with FIG. 24.

In the above-described explanation of the picture printing system 1, the STB 3 and the printing device 5 are provided with the data conversion unit 13 and with the data input unit 31, as interfacing circuits conforming to the IEEE 1394 standard, respectively. However, the data conversion unit 13 and the data input unit 31 may also be other interfacing circuits, such as other USBs. That is, in the picture printing system 1 provided with the STB 3 and the printing device 5, having the USBs, it is possible to transmit/receive packets between the data conversion unit 13 and with the data input unit 31 in a digital system to permit the printing device 5 to print a fine picture.

INDUSTRIAL APPLICABILITY

In the printing device and method, according to the present invention, should bus resetting occur with the printing control device during inputting picture data, the input/output means is controlled by control means to output the information on picture data input before occurrence of the bus resetting is output to the printing control device. It is therefore possible to permit the printing control device to recognize the information input by the input/output means before occurrence of the bus resetting, so that, in this printing device and method, should bus resetting occur during data transmission, data transmission may be re-initiated as from mid data to enable data transmission in a shorter time to achieve an overall shorter printing time.

In the printing control device and method, according to the present invention, should bus resetting occur with the printing device during outputting picture data, the printing device is requested to transmit the information on the printing data output before occurrence of the bus resetting. Thus, the information output before occurrence of the bus resetting can be recognized, so that, in this printing control device and method, data transmission can be re-initiated as from the mid data even if bus resetting occurs during data transmission to enable data transmission in a shorter time to achieve an overall shorter printing time.

In the printing system and method, according to the present invention, should bus resetting occur between the printing control device and the printing device during transmission of printing data, the printing device is requested by the printing control device to transmit the information output before occurrence of bus resetting. Thus, the printing device outputs the information input before occurrence of bus resetting responsive to the request to the printing control device, and the printing control device then re-outputs the printing data based on the information output from the printing device, thus enabling recognition by the information output by the printing control device before occurrence of bus resetting. So, in this printing system and method, should bus resetting occur during data transmission, data transmission may be re-initiated as from mid data to enable data transmission in a shorter time to achieve an overall shorter printing time.

In the picture data transferring method, according to the present invention, should the bus resetting occur with the receiving device during outputting of picture data, the receiving device is requested to transmit the information on the picture data output before occurrence of bus resetting. Thus, the information output before occurrence of the bus resetting can be recognized. The information on the picture data is at least one of the data position information, the printing page information and the printing picture information, derived from the data size of data received by the receiving device. So, in this picture data transferring method, data transmission can be re-initiated as from the mid data even if bus resetting occurs during data transmission to enable data transmission in a shorter time to achieve an overall shorter printing time.

In the picture data receiving method, according to the present invention, should the bus resetting occur with the picture data transferring device during inputting of picture data, the information on the picture data input before occurrence of bus resetting is outputted to the picture data transferring device. Thus, the information input before occurrence of the bus resetting can be recognized by the picture data transferring device. The information on the picture data is at least one of the data position information, the printing page information and the printing picture information, derived from the data size of data transferred from the picture data transferring device. So, in this picture data receiving method, data transmission can be re-initiated as from the mid data even if bus resetting occurs during data transmission to enable data transmission in a shorter time to achieve an overall shorter printing time.

What is claimed is:

1. A printing device comprising:

printing means for performing printing using printing data from a printing control device;

input/output means for receiving from said printing control device printing data and information pertinent to said printing data comprehended in one or more packets conforming to the IEEE (The Institute of Electrical and Electronics Engineers)1394 standard, and for outputting a response packet responsive to a command packet conforming to the IEEE 1394 standard from said printing control device; and control means for controlling said input/output means for outputting to the printing control device the information; pertinent to said printing data; received by said input/output means before occurrence of bus resetting between the input/output means and the printing control device when such bus resetting occurs during inputting the printing data by said input/output means, said control means controlling said printing means to perform printing processing using printing data input by said input/output means.

2. The printing device according to claim 1 wherein said control means manages control to output to said printing control device at least one of the data position information, printing page information and the printing picture information, derived from the data size of data received by said input/output means, as the information pertinent to the printing data, input by said input/output means before occurrence of bus resetting;

said input/output means receiving printing data in one or more packets as from the printing data not received by said input/output means due to interruption by said bus resetting to permit said printing means to continue the printing processing.

3. A printing method for performing printing using printing data from a printing control device, comprising:

a step of outputting a response packet responsive to a command packet, conforming to the IEEE (The Institute of Electrical and Electronics Engineers) 1394 standard, input from a printing control device;

a step of receiving from said printing control device printing data and information pertinent to said printing data comprehended in one or more rackets conforming to the IEEE 1394 standard;

a step of managing control to output to said printing control device the information pertinent to said printing data received prior to occurrence of bus resetting, when such bus resetting occurs with respect to said printing control device as said printing data is input; and a step of performing the-printing using the received printing data.

4. The printing method according to claim 3 wherein control is managed to output at least one of the data position information, printing page information and the printing picture information, derived from the data size of received data, as the information pertinent to the printing data, input before occurrence of bus resetting; and receiving printing data in one or more packets as from the printing data not received due to interruption by said bus resetting to permit said printing step to continue the printing processing.

5. A printing control device comprising:

picture processing means for processing picture signals output from outside to generate printing data;

input/output means for comprehending printing data generated by said picture processing means and information pertinent to said printing data in one or more packets conforming to the IEEE (The Institute of Electrical and Electronics Engineers)1394 standard, and for outputting said one or more packets to a printing device; and control means for requesting said printing device to transmit to said input/output means the information pertinent to said printing data output by said input/output means before occurrence of bus resetting between the input/output means and the printing control device when such bus resetting occurs during outputting the printing data by said input/output means, said control means controlling said input/output means to perform the processing of re-outputting the printing data based on the information transmitted from said printing device.

6. The printing control device according to claim 5 wherein said control means manages control to receive at least one of the data position information, printing page information and the printing picture information, derived from the data size of data received by said printing device, responsive to the information pertinent to the printing data, output by said input/output means before occurrence of bus resetting, and to output by said input/output means printing data in one or more packets as from the printing data not received by said printing device due to interruption by said bus resetting.

7. The printing control device according to claim 5 wherein said picture signals are television signals and wherein printing data pertinent to television signals received are generated.

8. A printing control method for processing picture signals input from outside to generate printing data, comprising:
   a step of comprehending printing data generated on processing picture signals and information pertinent to said printing data in one or more packets conforming to the IEEE (The Institute of Electrical and Electronics Engineers) 1394 standard to output from a printing control device said packet said one or more packets to a printing device;
   a step of requesting said printing device to transmit to said printing control device the information pertinent to said printing data; output before occurrence of bus resetting with respect to said printing control device when such bus resetting occurs during outputting the printing data; and
   a step of managing control to perform the processing of re-outputting the printing data in one or more packets, based on the information pertinent to said printing data received from said printing device.

9. The printing control method according to claim 8 wherein control is managed so that at least one of the data position information, printing page information and the printing picture information, derived from the data size of data received by said printing device, responsive to the information pertinent to the printing data, output before occurrence of bus resetting, is input by said printing control device, and so that printing data as from the printing data not received by said printing device due to interruption by said bus resetting is output to said printing device in one or more packets.

10. The printing control method according to claim 8 wherein said picture signals are television signals and wherein printing data pertinent to television signals received are generated.

11. A printing system comprising:
   a printing control device having picture processing means for processing picture signals output from outside to generate printing data, first input/output means for comprehending printing data generated by said picture processing means and information pertinent to said printing data in one or more packets conforming to the IEEE (The Institute of Electrical and Electronics Engineers)1394 standard, and for outputting said one or more packets to a printing devices and control means for controlling said first input/output means; and a printing device having printing means for performing printing using printing data received from said printing control device, and second input/output means for receiving from said printing control device said printing data and said information pertinent to said printing data comprehended in said one or more packets and for outputting a response packet responsive to a command packet from said printing control device;
   said first input/output means requesting said printing device to transmit to said first input/output means the received information pertinent to said printing data output before occurrence of bus resetting between the input/output means and the printing control device when such bus resetting occurs during transmission of the printing data from the first input/output means to second input/output means,
   said second input/output means outputting to said first input/output means the received information pertinent to said printing data input before occurrence of the bus resetting responsive to the request from said first input/output means,
   said first input/output means re-outputting printing data in one or more packets based on the information pertinent to said printing data output by said second input/output means.

12. The printing system according to claim 11 wherein said second input/output means generates at least one of the data position information, printing page information and the printing picture information, based on the printing data received before occurrence of bus resetting, responsive to a request from said control means, and comprehends the generated information in a response packet to output the information comprehended in said response packet to said printing control device; said control means managing control to output to said printing device the printing data in one or more nackets as from data not received by said printing device based on at least one of the data position information, printing page information and the printing picture information comprehended in said response packet.

13. A printing method comprising:
   transmitting printing data and information pertinent to said printing from first input/output means comprised in a transmission device to second input/output means comprised in a printing device;
   requesting said printing device to transmit the information pertinent to said printing data output by said first input/output means before occurrence of bus resetting between the transmission device and the printing device if such bus resetting occurs during transmission of the printing data;
   outputting from said second input/output means to said first input/output means the information pertinent to said printing data input before occurrence of bus resetting responsive to a request made by said first input/output means;
   re-outputting the printing data from said first input/output means to said second input/output means, based on the information pertinent to said printing data received by said transmission device responsive to said request to said printing device, to perform the printing on said printing device using said printing data.

14. The printing method according to claim 13 wherein said printing device generates at least one of the data position information, printing page information and the printing picture information, based on the printing data received before occurrence of bus resetting, responsive to said request, and comprehends the generated information in a response packet to output the information comprehended in said response packet to said printing control device; said transmission device managing control to output to said printing device the printing data not received by said printing device based on the data position information comprehended in said response packet.

15. A picture data transferring method for processing picture signals input from outside to generate picture data to be transferred, comprising:

a step of outputting to a reception device picture data generated on processing said picture signals input from outside and information pertinent to said printing data as said printing data and information pertinent to said printing data is comprehended in a one or more packets conforming to the IEEE (The Institute of Electrical and Electronics Engineers) 1394 standard;

a step of requesting said reception device to transmit the information pertinent to said picture data output before occurrence of bus resetting with respect to said reception device when such bus resetting occurs during outputting the printing data; and a step of managing control to perform the processing of re-outputting the printing data in one or more packets, based on the information pertinent to said printing data output from said reception device; wherein at least one of the data position information, printing page information and the printing picture information, derived from the data size of data received by said reception device, responsive to the information pertinent to said printing data; input before occurrence of bus resetting, is input.

16. A picture data receiving method for receiving picture data from a picture data transferring device, comprising:

a step of outputting a response packet responsive to a command packet conforming to the IEEE (The Institute of Electrical and Electronics Engineers)1394 standard; input from said-a picture data transferring device;

a step of receiving from said picture data transferring device said-picture data and information pertinent to said picture data, comprehended in one or more packets conforming to still image data IEEE 1394 standard; and a step of managing control so that, if bus resetting occurs with respect to said picture data transferring device during inputting the picture data, the information pertinent to said picture data input before occurrence of bus resetting is output to said picture data transferring device;

wherein control is managed so that, as the information pertinent to said picture data input before occurrence of said bus resetting, at least one of the data position information, printing page information and the printing picture information, derived from the data size of received data, will be output to said picture data transferring device; and wherein picture data as from the picture data not received by said reception device due to interruption by said bus resetting is received in one or more packets for processing.

17. The printing device according to claim 1 wherein said information pertinent to the printing data is received by the input/output means from the printing control device before the occurrence of bus resetting.

18. The printing device according to claim 17 wherein said information pertinent to the printing data includes data indicating the next page to be printed.

19. The printing device according to claim 17 wherein said information pertinent to the printing data includes data indicating the next picture to be printed.

* * * * *